United States Patent
Takei

(10) Patent No.: US 11,460,714 B2
(45) Date of Patent: Oct. 4, 2022

(54) OPTICAL UNIT WITH SHAKE CORRECTION FUNCTION

(71) Applicant: NIDEC SANKYO CORPORATION, Nagano (JP)

(72) Inventor: Hiromitsu Takei, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 227 days.

(21) Appl. No.: 16/988,999

(22) Filed: Aug. 10, 2020

(65) Prior Publication Data

US 2021/0041717 A1    Feb. 11, 2021

(30) Foreign Application Priority Data

Aug. 9, 2019   (JP) .............................. JP2019-147310

(51) Int. Cl.
  *G02B 27/64*    (2006.01)
  *G03B 5/06*    (2021.01)
(52) U.S. Cl.
  CPC ............. *G02B 27/646* (2013.01); *G03B 5/06* (2013.01); *G03B 2205/0023* (2013.01); *G03B 2205/0069* (2013.01)

(58) Field of Classification Search
  None
  See application file for complete search history.

(56) References Cited

U.S. PATENT DOCUMENTS

| | | | |
|---|---|---|---|
| 2020/0393693 A1* | 12/2020 | Takei | G02B 27/646 |
| 2020/0393694 A1* | 12/2020 | Takei | G03B 5/06 |
| 2021/0041715 A1* | 2/2021 | Takei | G02B 7/026 |
| 2021/0240000 A1* | 8/2021 | Kasahara | H04N 5/23287 |
| 2021/0278691 A1* | 9/2021 | Hatano | G02B 7/02 |
| 2021/0278692 A1* | 9/2021 | Kasahara | G02B 7/023 |
| 2021/0278693 A1* | 9/2021 | Kasahara | G02B 7/003 |

FOREIGN PATENT DOCUMENTS

JP    2015082072 A    4/2015

* cited by examiner

*Primary Examiner* — Derek S. Chapel
(74) *Attorney, Agent, or Firm* — Cantor Colburn LLP

(57) ABSTRACT

In an optical unit with a shake correction function, a rotation support structure, which supports a movable body rotatably around an optical axis, may be supported by a gimbal structure rotatably around a first axis and a second axis intersecting with the optical axis so that, even when the movable body is rotating around the first axis or the second axis, the rotation axis of the movable body by the rotation support structure coincides with the optical axis of the movable body.

9 Claims, 14 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2019-147310 filed on Aug. 9, 2019, the entire content of which is incorporated herein by reference.

BACKGROUND

Field of the Invention

At least an embodiment of the present invention relates to an optical unit with a shake correction function to rotate an imaging module around an optical axis so as to correct the shake.

Description of the Related Art

In some optical units installed in mobile terminals or mobile objects, a movable body including an optical module is rotated around an optical axis, a first axis perpendicular to the optical axis, and a second axis perpendicular to the optical axis and the first axis to suppress the blur of images captured during the movement of the mobile terminal or the mobile object. Japanese Patent Application Publication No. 2015-82072 discloses this type of optical unit with a shake correction function.

The optical unit with a shake correction function disclosed in Japanese Patent Application Publication No. 2015-82072 includes: a movable body; a securing body; and a rotation support structure supporting the movable body rotatably around a predetermined axis with respect to the securing body. The movable body includes an optical module including a lens, a support surrounding the optical module, and a gimbal structure provided inside the support and supporting the optical module rotatably around a first axis and a second axis. The optical unit with a shake correction function further includes a rotation magnetic drive structure rotating the optical module in the movable body around the first axis and the second axis and a rolling magnetic drive structure rotating the movable body around a predetermined axis so as to rotate the optical module around the optical axis.

In the optical unit with a shake correction function disclosed in Japanese Patent Application Publication No. 2015-82072, when the optical module is not rotating around the first axis or the second axis, the optical axis coincides with a predetermined rotation axis of the movable body (the rotation axis of the support) by the rotation support structure. When the optical module is rotating around the first axis or the second axis, however, the rotation axis of the movable body by the rotation support structure does not coincide with the optical axis of the optical module in the movable body. Therefore, there is a disadvantage such that, when a rolling magnetic drive structure is driven so that the movable body is rotated while the optical module is rotating around the first axis or the second axis, the optical module does not rotate around the optical axis.

In view of the above-described point, at least an embodiment of the present invention has an object to provide an optical unit with a shake correction function so as to cause a movable body to rotate around the rotation axis that coincides with the optical axis.

SUMMARY

In order to solve the above-described disadvantage, an optical unit with a shake correction function according to at least an embodiment of the present invention may include: a movable body including a lens; a rotation support structure to support the movable body rotatably around an optical axis of the lens; a gimbal structure to support the rotation support structure rotatably around a first axis intersecting with the optical axis and rotate around a second axis intersecting with the optical axis and the first axis; a securing body to support the movable body via the gimbal structure and the rotation support structure; a shake-correction magnetic drive structure to rotate the movable body around the first axis and the second axis; and a rolling-correction magnetic drive structure to rotate the movable body around the optical axis, where the rotation support structure may include: a plate roll secured to the movable body; a plate holder including a facing portion that faces the plate roll; and a rotation structure allowing rotation of the plate roll and the plate holder, the shake-correction magnetic drive structure may include: a shake-correction magnet secured to the movable body; and a shake-correction coil secured to the securing body and facing the shake-correction magnet, the rolling-correction magnetic drive structure may include: a rolling-correction magnet secured to the movable body; and a rolling-correction coil secured to the securing body and facing the rolling-correction magnet, the shake-correction magnet and the rolling-correction magnet may be arranged in a circumferential direction around the optical axis, the rotation structure may include a plurality of spherical objects that roll in contact with the plate roll and the facing portion, and the plate holder may be made of a magnetic material and may be disposed on a side opposite to the shake-correction magnet and the rolling-correction magnet with respect to the plate roll.

According to at least an embodiment of the present invention, the rotation support structure, which supports the movable body rotatably around the optical axis, may be supported by the gimbal structure rotatably around the first axis and the second axis. Thus, the movable body may rotate around the rotation axis that coincides with the optical axis even when the movable body is rotating around the first axis or the second axis.

In the rotation support structure, the rotation structure, which allows the plate roll secured to the movable body to rotate relative to the plate holder, may include the spherical objects that roll in contact with the plate roll and the facing portion of the plate holder. With this type of rotation structure, there is a disadvantage such that the plate roll does not smoothly rotate relative to the plate holder without the application of force that causes the spherical objects to be always in contact with both the plate roll and the facing portion. In order to solve this disadvantage, according to at least an embodiment of the present invention, the plate holder may be made of a magnetic material, and the shake-correction magnet of the shake-correction magnetic drive structure and the rolling-correction magnet of the rolling-correction magnetic drive structure may be located on the side opposite to the plate holder with respect to the plate roll. Therefore, the shake-correction magnet and the rolling-correction magnet attract the plate holder toward the plate roll. In other words, the shake-correction magnet and the rolling-correction magnet constitute a pressurization structure that applies the force to bring the plate holder and the plate roll close to each other. Thus, in the rotation support structure, the rotation structure allows the plate roll to smoothly rotate relative to the plate holder.

According to at least an embodiment of the present invention, the first axis may be perpendicular to the optical axis, the second axis may be perpendicular to the optical axis and the first axis, the shake-correction magnet may include a first magnet and a second magnet that are arranged in the circumferential direction with the first axis interposed therebetween, and the rolling-correction magnet may be disposed on a side opposite to the first magnet or the second magnet with the optical axis interposed between the first magnet and the second magnet. Thus, the shake-correction magnet and the rolling-correction magnet may attract the plate holder in three directions around the optical axis.

According to at least an embodiment of the present invention, the plate roll may include a plate-roll annular portion overlapping with the movable body when viewed in a direction of the optical axis, the plate-roll annular portion may be coaxial with the optical axis, the plate holder may include, as the facing portion, a plate-holder annular portion facing the plate-roll annular portion, and the first magnet, the second magnet, and the rolling-correction magnet may be disposed on an outer circumference side of the plate-roll annular portion. Thus, the shake-correction magnet and the rolling-correction magnet may easily attract the plate-holder annular portion.

According to at least an embodiment of the present invention, the plate holder may include: a first protrusion protruding from the plate-holder annular portion toward the first magnet; a second protrusion protruding from the plate-holder annular portion toward the second magnet; and a third protrusion protruding from the plate-holder annular portion toward the rolling-correction magnet. Thus, the shake-correction magnet and the rolling-correction magnet may be close to the plate holder. Hence, the shake-correction magnet and the rolling-correction magnet may easily attract the plate holder.

According to at least an embodiment of the present invention, the plate holder may include a pair of plate-holder extension portions protruding from the plate-holder annular portion to both sides in the direction of the first axis and extending in the direction of the optical axis on both sides in the direction of the first axis of the movable body. The gimbal structure may include a gimbal frame and a first coupling structure to couple the plate holder and the gimbal frame rotatably around the first axis. The gimbal frame may include a gimbal-frame main body overlapping with the movable body when viewed in the direction of the optical axis and a pair of first-axis side gimbal frame extension portions protruding from the gimbal-frame main body to both sides in the direction of the first axis and extending in the direction of the optical axis on an outer circumference side of the pair of plate-holder extension portions. The first coupling structure may include a pair of first-axis side shafts held by the pair of first-axis side gimbal-frame extension portions, respectively, and protruding to an inner circumference side on the first axis, and a first-axis side recessed curved face provided in each of the plate-holder extension portions and rotatably contacting with an end of the first-axis side shaft. The gimbal-frame main body may be disposed on a side opposite to the first magnet, the second magnet, and the rolling-correction magnet with the plate-roll annular portion and the plate-holder annular portion in the direction of the optical axis. Thus, the gimbal frame may support the rotation support structure, which supports the movable body, rotatably around the first axis. Furthermore, when the gimbal frame supports the movable body via the rotation support structure, the first magnet, the second magnet, and the rolling-correction magnet mounted on the movable body may attract the plate-holder annular portion of the rotation support structure.

The gimbal structure may include a second coupling structure to couple the gimbal frame and the securing body rotatably around the second axis, the securing body may include a frame to surround an outer circumference side of the movable body, the rotation support structure, and the gimbal frame, and the second coupling structure may include: a pair of second-axis side shafts held by diagonal corners in the direction of the second axis of the frame and protruding along the second axis from the frame to an inner circumference side; and a pair of second-axis side recessed curved faces provided in the gimbal frame and contacting with ends of the pair of second-axis side shafts, respectively. Thus, the gimbal frame and the securing body may be easily coupled rotatably around the second axis.

According to at least an embodiment of the present invention, a pressurization magnet secured to the plate-roll annular portion and facing the plate-holder annular portion may be provided. Thus, the plate-holder annular portion made of a magnetic material may be attracted toward the plate-roll annular portion by the pressurization magnet.

According to at least an embodiment of the present invention, the rotation support structure, which supports the movable body rotatably around the optical axis, may be supported by the gimbal structure rotatably around the first axis and the second axis. Therefore, the movable body may rotate around the rotation axis that coincides with the optical axis even when the movable body is rotating around the first axis or the second axis. The rotation support structure may include the spherical objects that roll in contact with the plate roll and the facing portion of the plate holder, and the shake-correction magnet and the rolling-correction magnet may constitute the pressurization structure that applies the force to bring the plate holder and the plate roll close to each other. Thus, the rotation support structure allows the plate roll to rotate smoothly relative to the plate holder.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

An optical unit with a shake correction function according to at least an embodiment of the present invention is described below with reference to the drawings.

Overall Configuration

Figure 1:
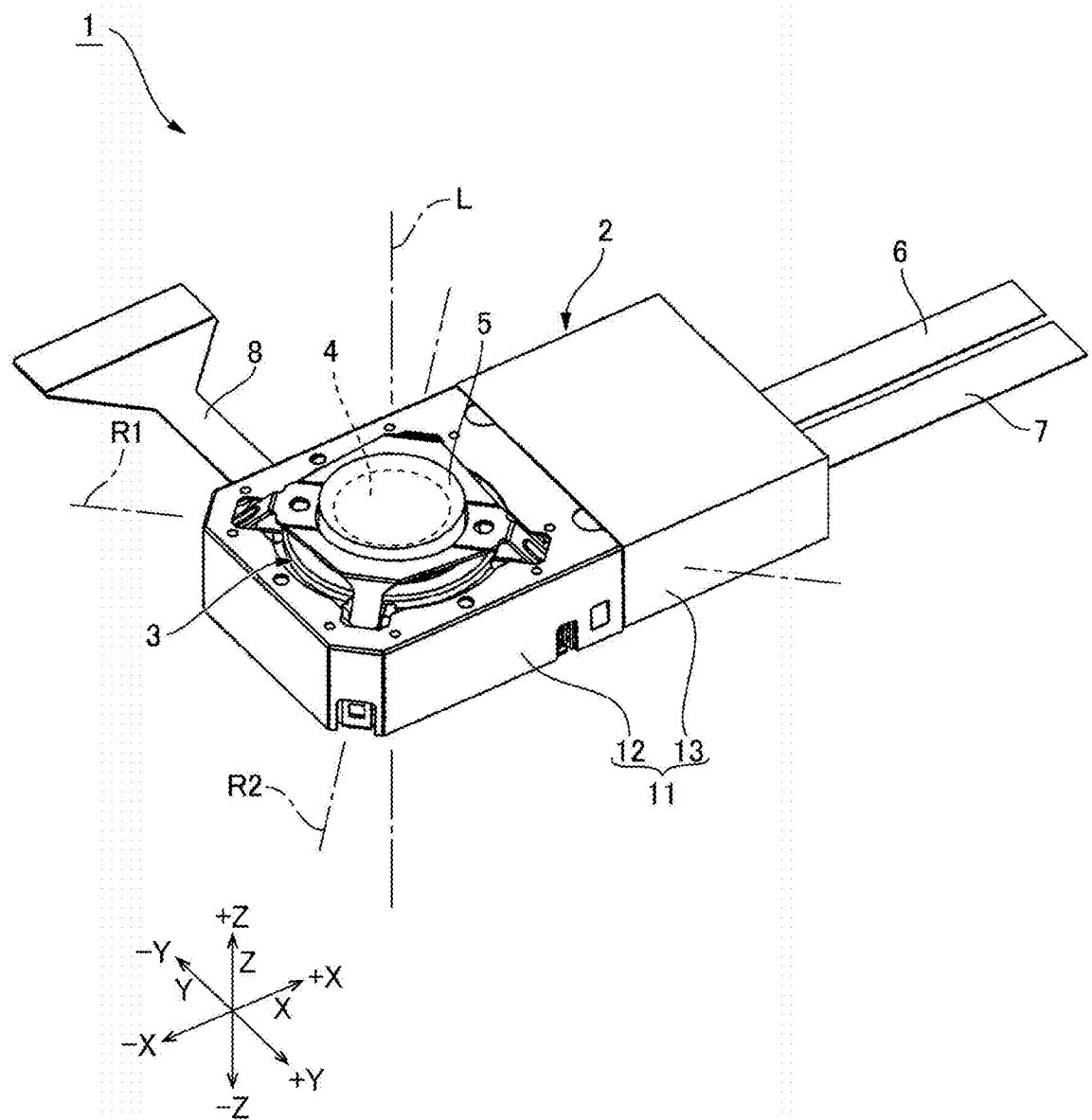
FIG. 1 is a perspective view of an optical unit with a shake correction function.
Figure 2:
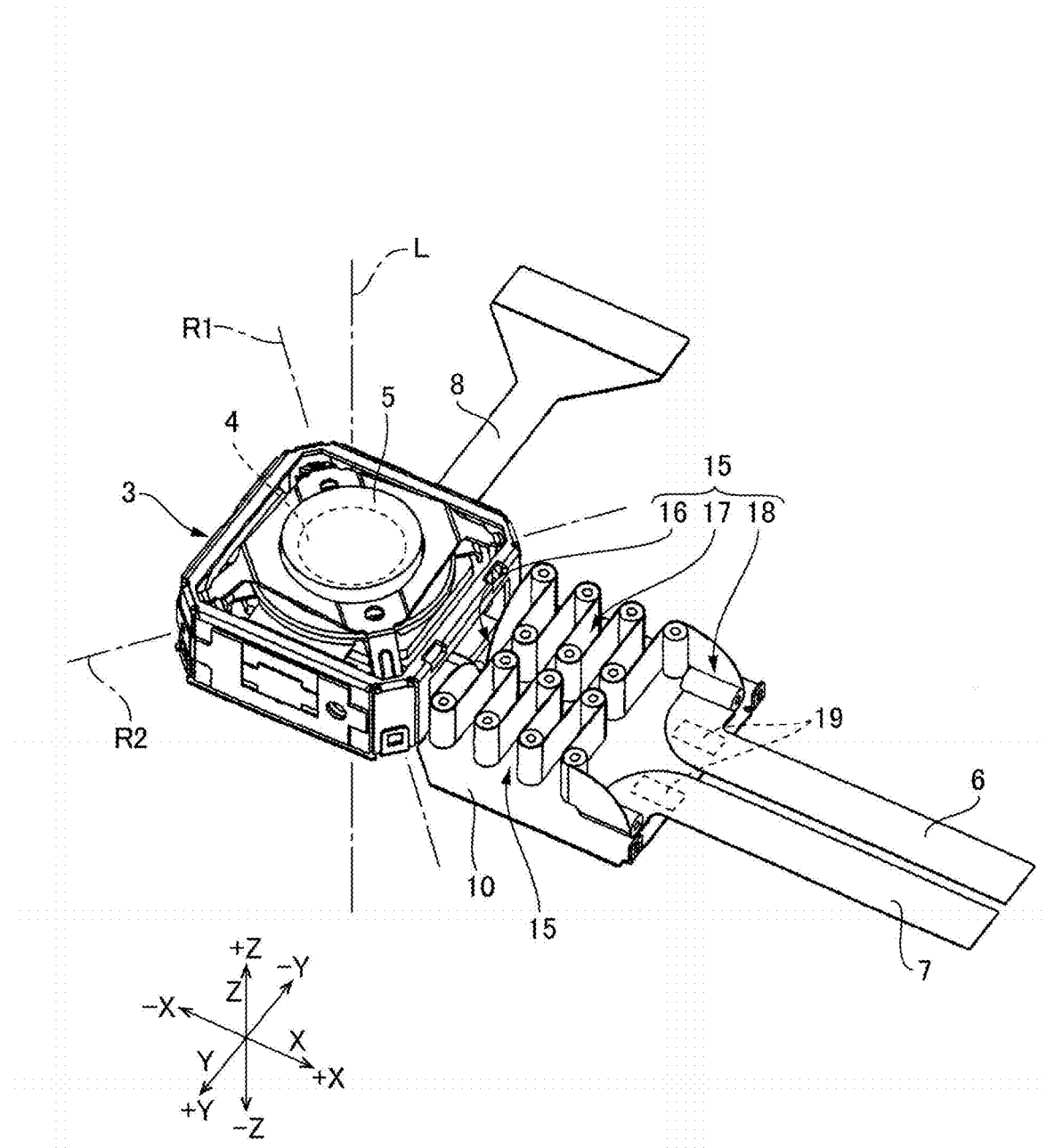
FIG. 2 is a perspective view of the optical unit with a shake correction function from which an object-side cover has been removed.
Figure 3:
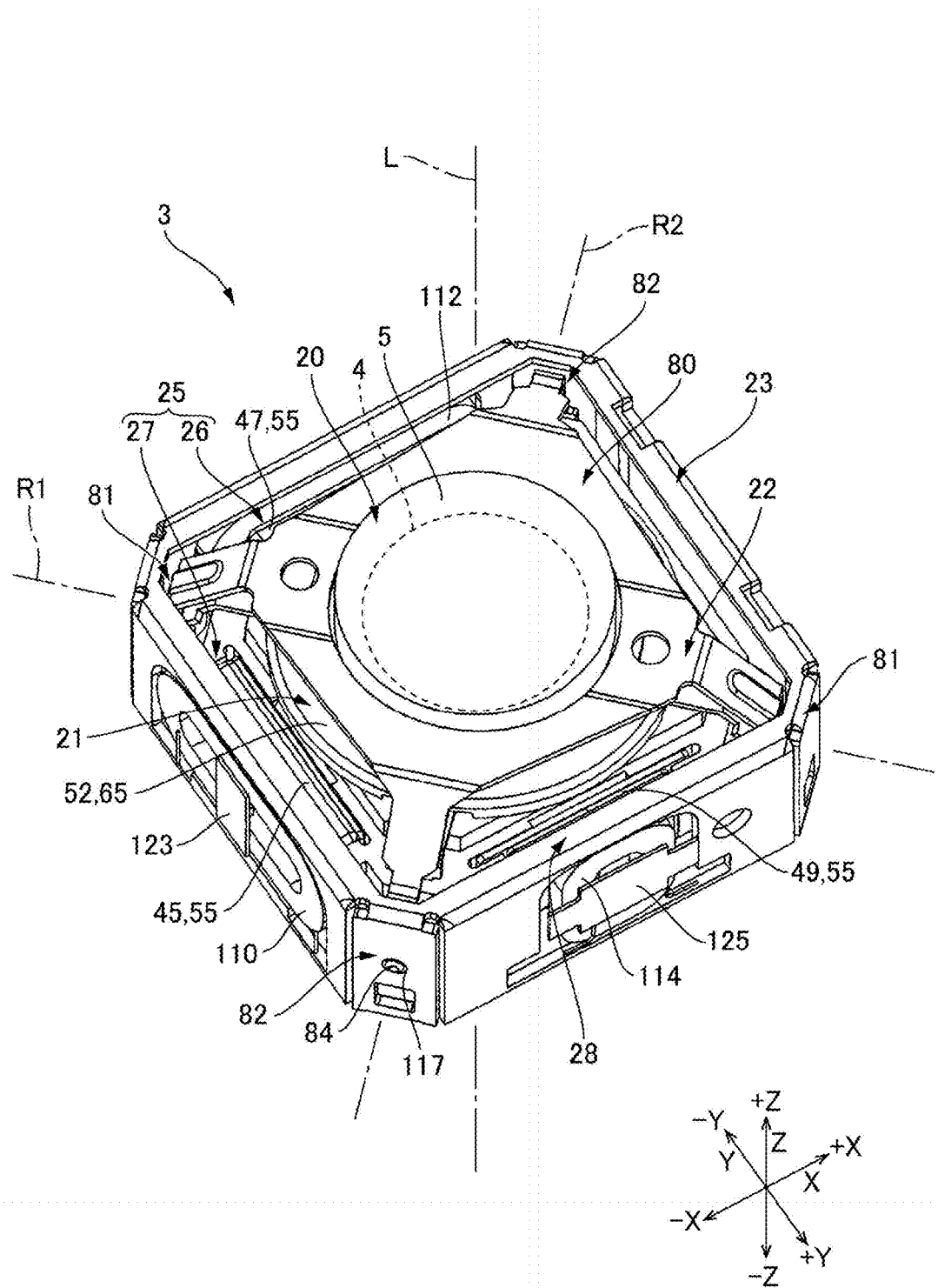
FIG. 3 is a perspective view of an optical-unit main body.
Figure 4:
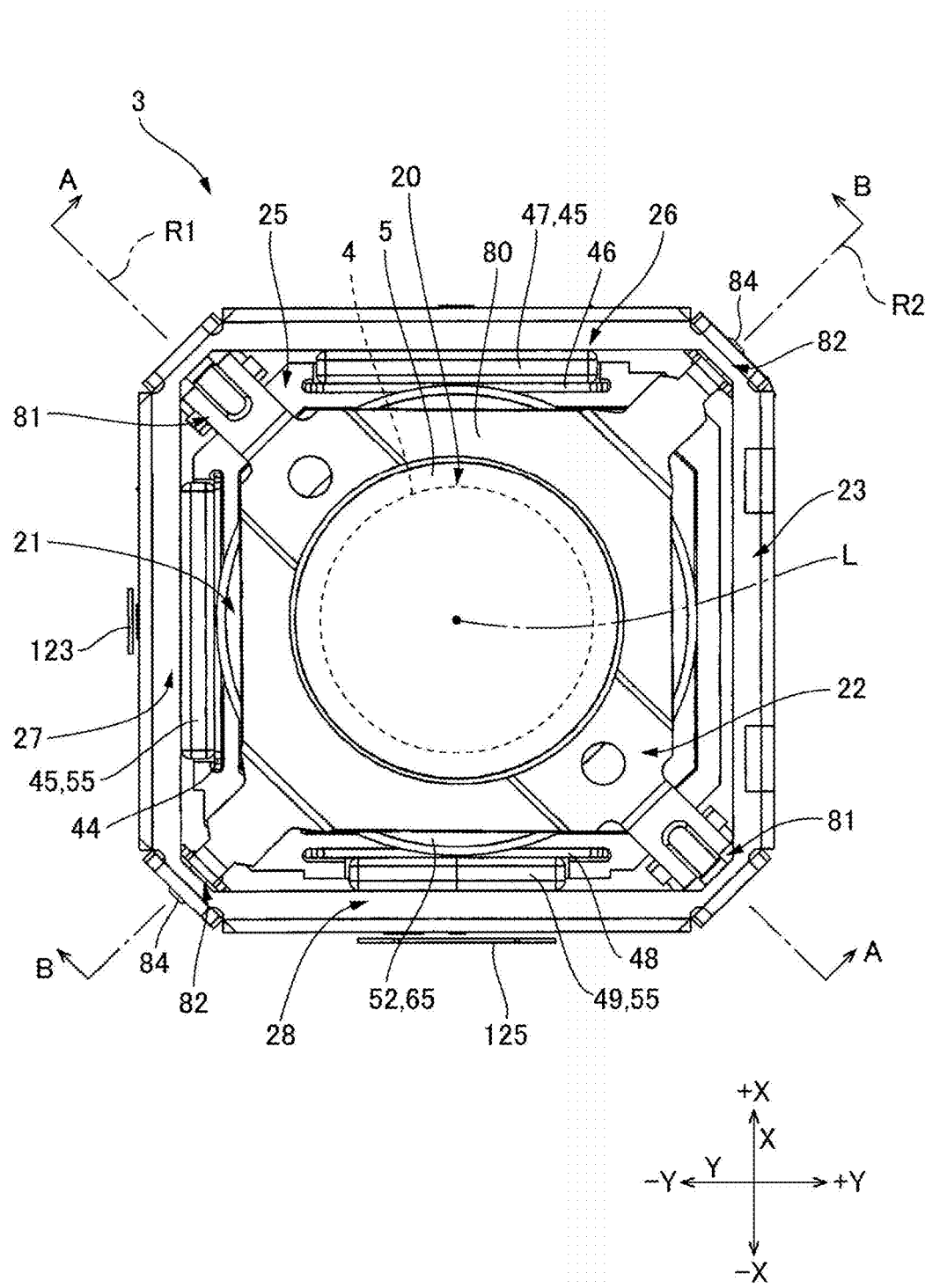
FIG. 4 is a plan view of the optical-unit main body when viewed in an optical axis direction.
Figure 5:
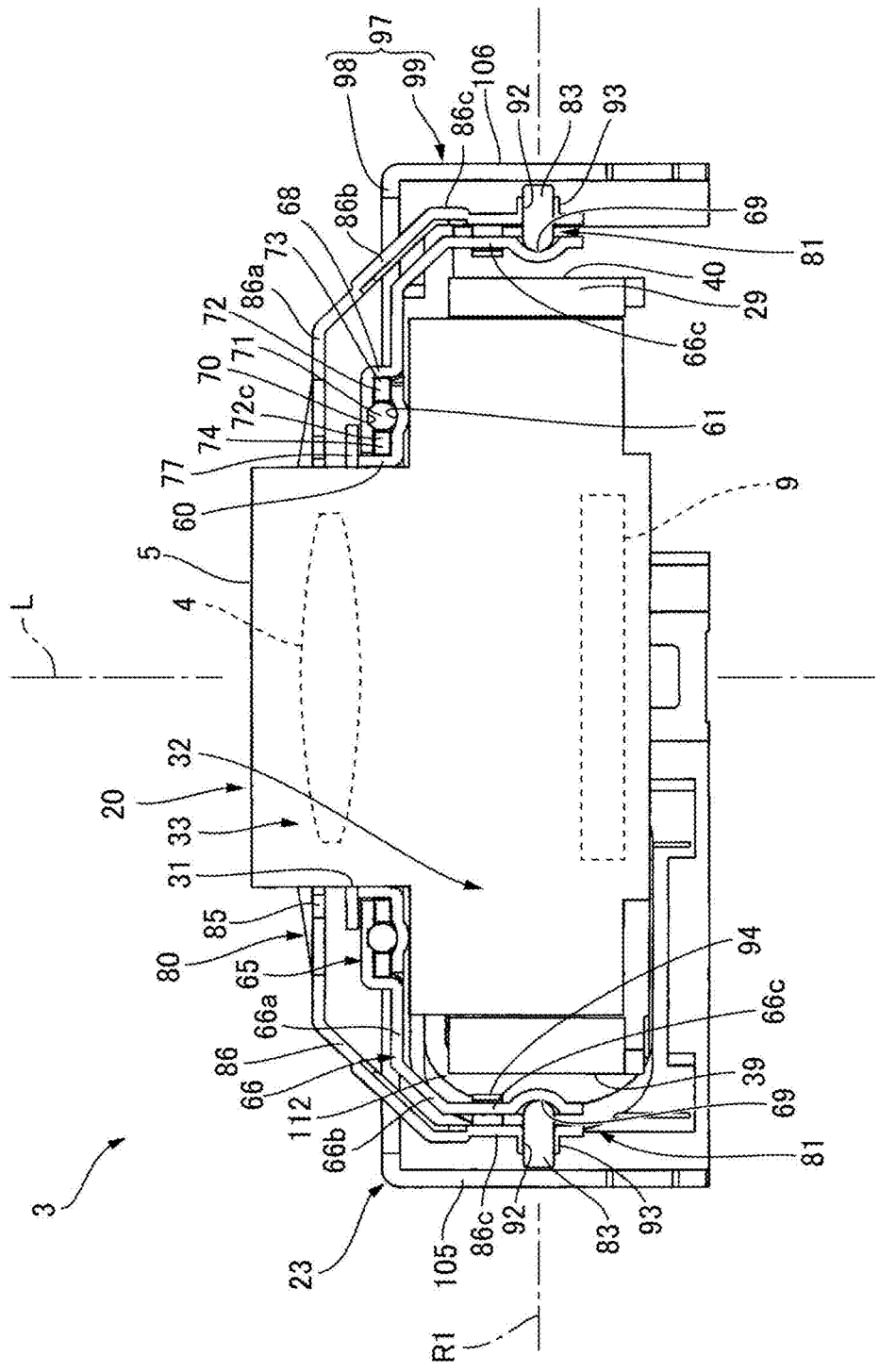
FIG. 5 is a cross-sectional view taken along the line A-A in FIG. 4.
Figure 6:
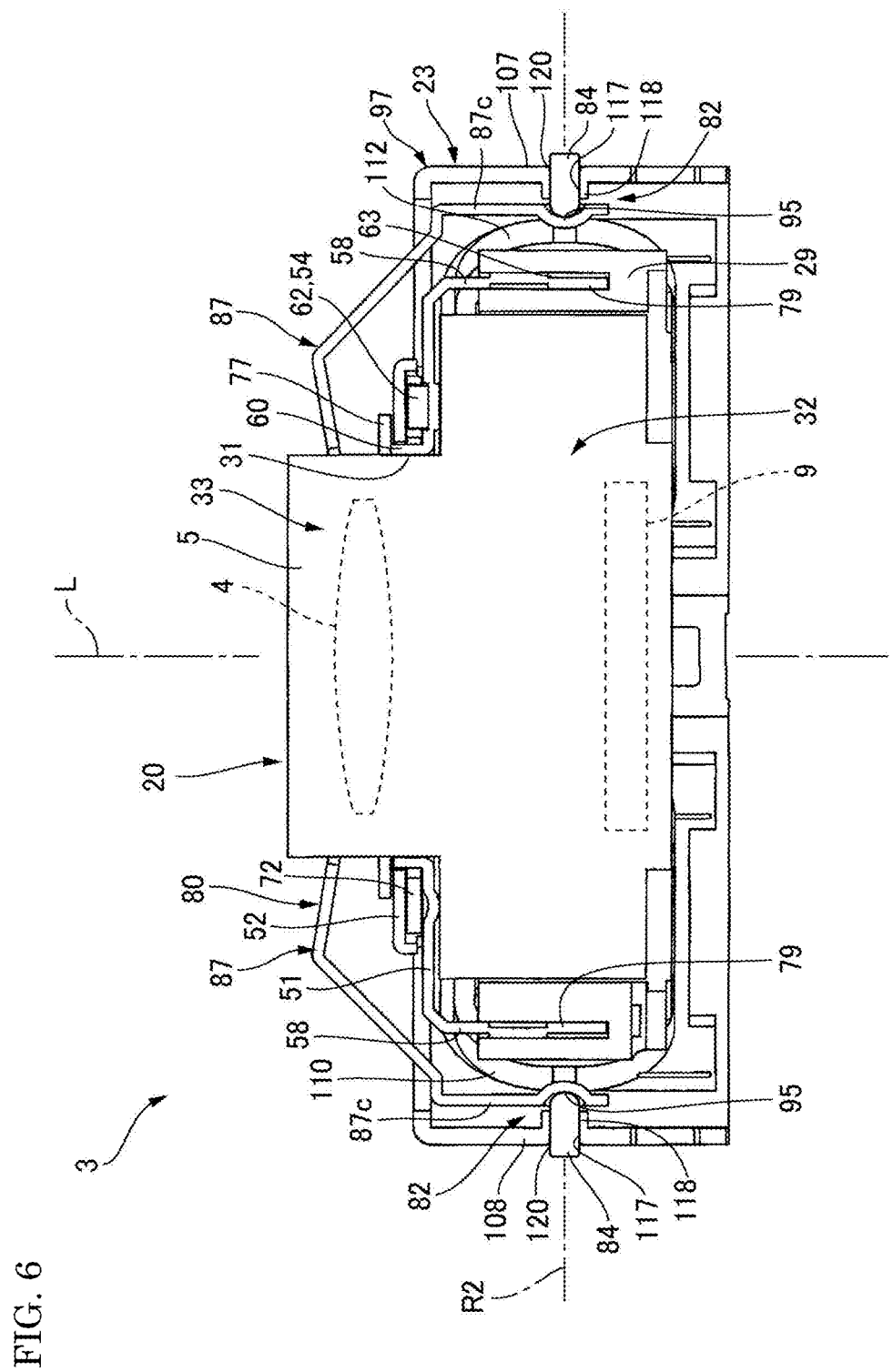
FIG. 6 is a cross-sectional view taken along the line B-B in FIG. 4.
Figure 7:
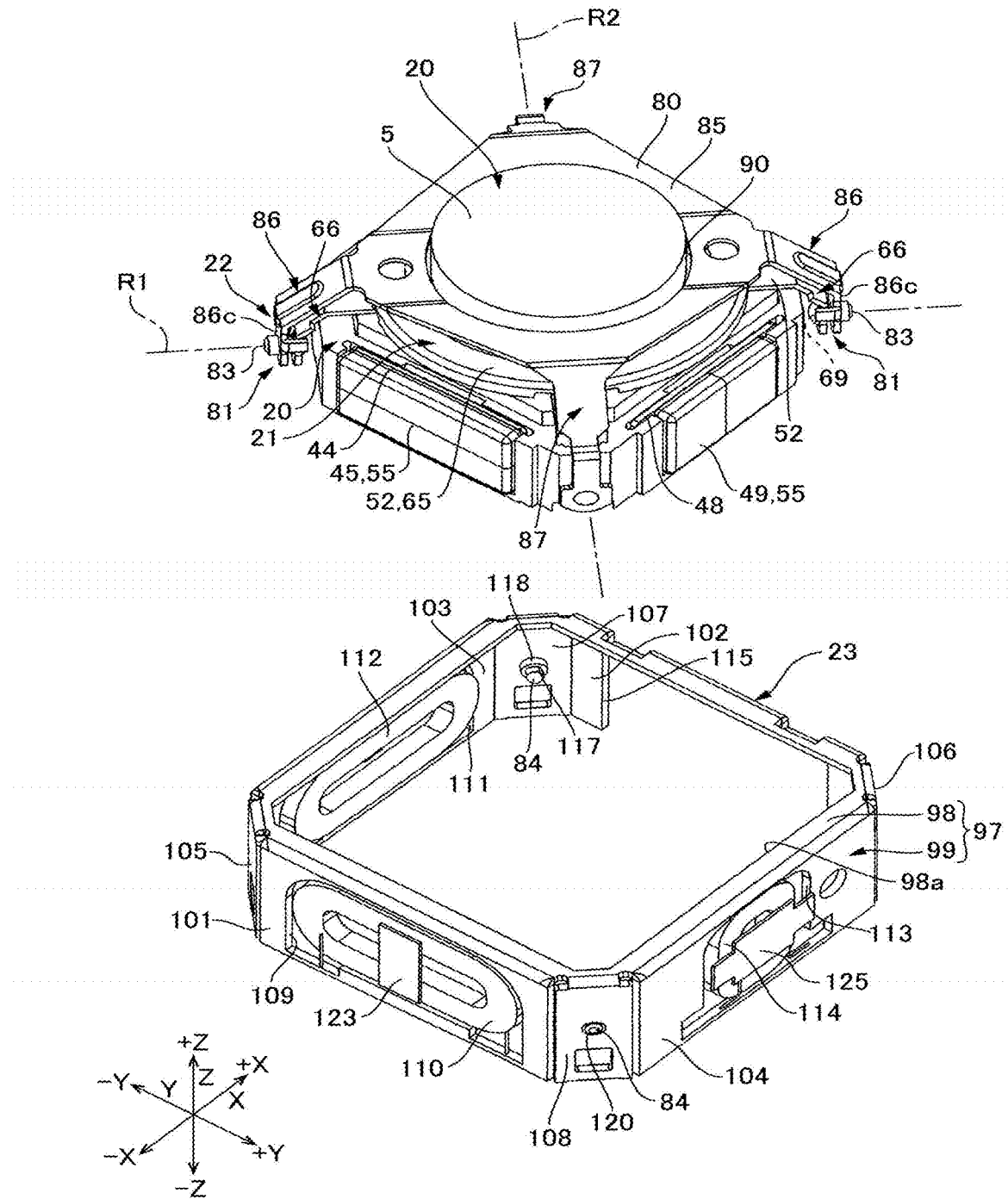
FIG. 7 is an exploded perspective view of the optical-unit main body.

FIG. 1 is a perspective view of an optical unit 1 with a shake correction function. FIG. 2 is a perspective view of the optical unit 1 with a shake correction function from which an object-side cover has been removed. FIG. 3 is a perspective view of an optical-unit main body 3. FIG. 4 is a plan view of the optical-unit main body 3 when viewed in an optical axis direction. A first flexible printed board 6, a second flexible printed board 7, and a third flexible printed board 8 extending from the optical-unit main body 3 are omitted from the illustrations in FIG. 3 and FIG. 4. FIG. 5 is a cross-sectional view taken along the line A-A in FIG. 4. FIG. 6 is a cross-sectional view taken along the line B-B in FIG. 4. FIG. 7 is an exploded perspective view of the optical-unit main body 3.

As illustrated in FIG. 1 and FIG. 2, the optical unit 1 with a shake correction function includes: a cuboid cover 2; and the optical-unit main body 3 housed in the cover 2. The optical-unit main body 3 includes an imaging module 5 including a lens 4 and an imaging element 9 (see FIG. 8). The first flexible printed board 6 and the second flexible printed board 7 extend from the cover 2 in parallel. The third flexible printed board 8 extends from the cover 2 in a direction different from the extending direction of the first flexible printed board 6 and the second flexible printed board 7.

The optical unit 1 with a shake correction function is used in, for example, mobile phones with a camera, optical devices such as dashboard cameras, or optical devices such as action cameras or wearable cameras installed in a moving body such as helmet, bicycle, or radio-controlled helicopter. With such an optical device, if the shake of the optical device occurs during imaging, the captured image is disturbed. To prevent the inclination of a captured image, the optical unit 1 with a shake correction function corrects the inclination of the imaging module 5 based on the acceleration, the angular velocity, the degree of shake, etc., detected by a detecting unit such as a gyroscope.

The optical unit 1 with a shake correction function according to this example rotates the imaging module 5 around an optical axis L of the lens 4, around a first axis R1 perpendicular to the optical axis L, and around a second axis R2 perpendicular to the optical axis L and the first axis R1 so as to correct the shake.

In the following description, the three axes perpendicular to one another are the X-axis direction, the Y-axis direction, and the Z-axis direction. One side of the X-axis direction is the −X direction and the other side thereof is the +X direction. One side of the Y-axis direction is the −Y direction, and the other side thereof is the +Y direction. One side of the Z-axis direction is the −Z direction, and the other side thereof is the +Z direction. The X-axis direction is the longitudinal direction of the cover 2. The Y-axis direction is the lateral direction of the cover 2. The first flexible printed board 6 and the second flexible printed board 7 extend from the cover 2 in the +X direction. The third flexible printed board 8 extends from the cover 2 in the −Y direction. The Z-axis direction is the optical axis direction along the optical axis L. The −Z direction is the image side of the imaging module 5, and the +Z direction is the object side of the imaging module 5. The first axis R1 and the second axis R2 are tilted around the Z-axis (around the optical axis L) by 45 degrees with respect to the X-axis and the Y-axis.

As illustrated in FIG. 2, the cover 2 includes a plate-shaped image-side cover 10 that covers the optical-unit main body 3 from the −Z direction. As illustrated in FIG. 1, the cover 2 includes an object-side cover 11 that is placed over the image-side cover 10 from the +Z direction. The object-side cover 11 includes: a first cover 12 having a frame-like shape and covering the outer circumference of the optical-unit main body 3; and a second cover 13 having a box-like shape and disposed in the +X direction of the first cover 12. The second cover 13 partially covers the first flexible printed board 6 and the second flexible printed board 7 that extend from the optical-unit main body 3 in the +X direction.

As illustrated in FIG. 2, each of the first flexible printed board 6 and the second flexible printed board 7 includes a bend portion 15 that is a portion covered with the second cover 13. The bend portion 15 includes: a first bend portion 16 that extends along the XY plane and bends in the Z-axis direction; a second bend portion 17 that bends in the X-axis direction along the YZ plane; and a third bend portion 18 that bends in the Y-axis direction along the XZ plane. The second bend portions 17 are disposed in the X-axis direction to form a winding arrangement. The end of the bend portion 15 of the flexible printed board in the +X direction is secured to the end of the image-side cover 10 in the +X direction via a reinforcing plate 19.

As illustrated in FIG. 3, FIG. 4, and FIG. 7, the optical-unit main body 3 includes: a movable body 20 including the imaging module 5; and a rotation support structure 21 rotatably supporting the movable body 20 around the optical axis L. The optical-unit main body 3 further includes: a gimbal structure 22 that supports the rotation support structure 21 rotatably the rotation support structure 21 around the first axis R1 and around the second axis R2; and a securing body 23 that supports the movable body 20 via the gimbal structure 22 and the rotation support structure 21. The movable body 20 is supported by the securing body 23 via the rotation support structure 21 and the gimbal structure 22 rotatably around the first axis R1 and the second axis R2. The movable body 20 rotates around the first axis R1 and the second axis R2 in combination to rotate around the X-axis and the Y-axis. Accordingly, the optical unit 1 with a shake correction function performs a pitching correction around the X-axis, a yawing correction around the Y-axis, and a rolling correction around the Z-axis.

The optical-unit main body 3 includes a shake-correction magnetic drive structure 25 that rotates the movable body 20 around the first axis R1 and the second axis R2. The shake-correction magnetic drive structure 25 includes: a first shake-correction magnetic drive structure 26 that generates a drive force around the X-axis for the movable body 20; and a second shake-correction magnetic drive structure 27 that generates a drive force around the Y-axis for the movable body 20. The first shake-correction magnetic drive structure 26 is disposed in the −Y direction from the imaging module 5. The second shake-correction magnetic drive structure 27 is disposed in the −X direction of the imaging module 5. The optical-unit main body 3 further includes a rolling-correction magnetic drive structure 28 that rotates the movable body 20 around the optical axis L. The rolling-correction magnetic drive structure 28 is disposed in the +Y direction from the imaging module 5.

The first shake-correction magnetic drive structure 26, the second shake-correction magnetic drive structure 27, and the rolling-correction magnetic drive structure 28 are arranged in the circumferential direction around the optical axis L. When viewed in the direction perpendicular to the optical axis L, the rolling-correction magnetic drive structure 28 is overlapping with the shake-correction magnetic drive structure 25. According to this example, the rolling-correction magnetic drive structure 28 and the first shake-correction magnetic drive structure 26 are disposed at the opposing positions with the optical axis L interposed therebetween.

As illustrated in FIG. 2, the third flexible printed board 8 extends along the outer circumference of the optical-unit main body 3. The third flexible printed board 8 extends from the outer circumference of the optical-unit main body 3 in the −Y direction.

Movable Body

Figure 8:
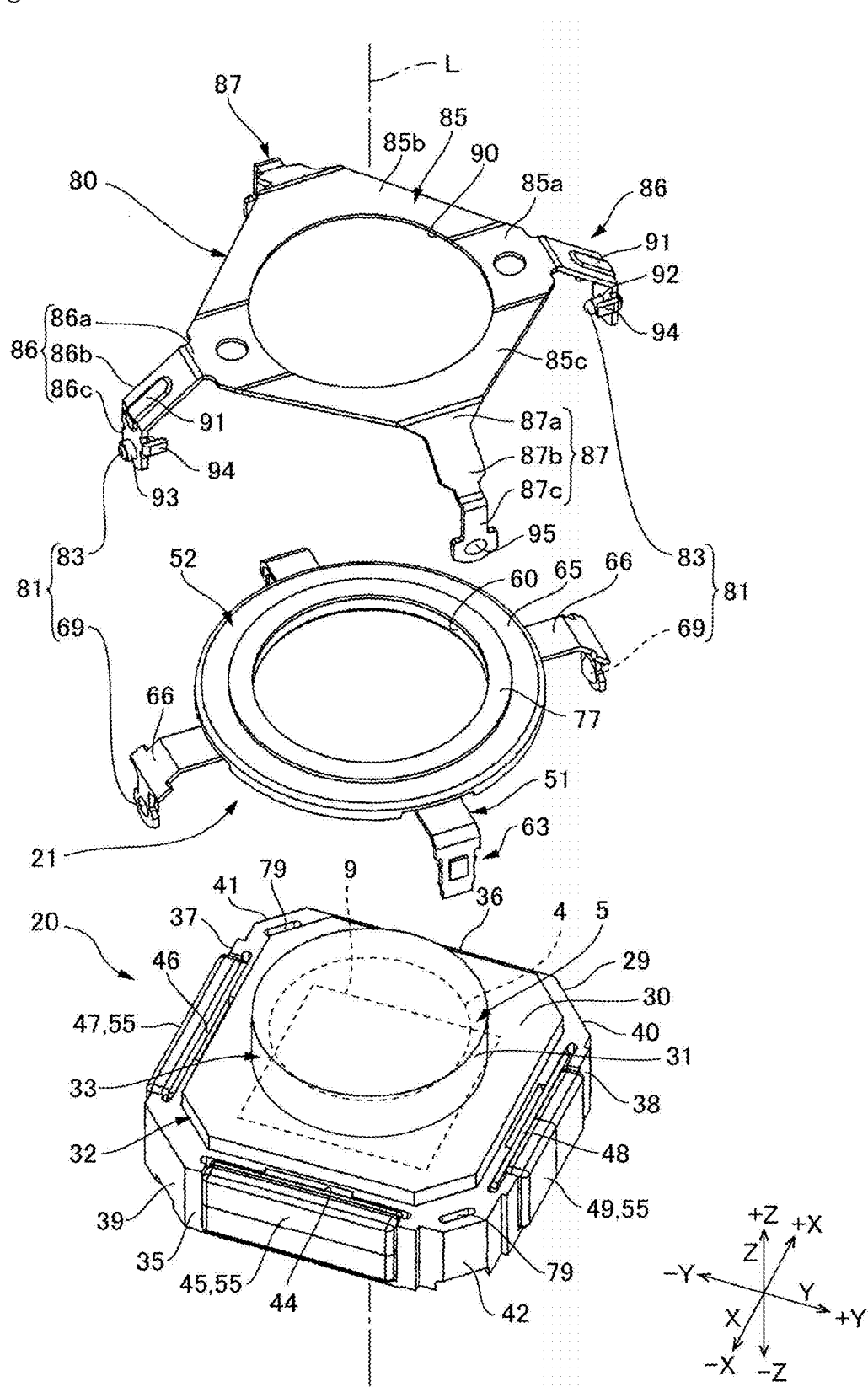
FIG. 8 is an explanatory diagram of a movable body, a rotation support structure, and a gimbal structure.

FIG. 8 is an explanatory diagram of the movable body 20, the rotation support structure 21, and the gimbal structure 22. As illustrated in FIG. 8, the movable body 20 includes: the imaging module 5; and a holder 29 having a frame-like shape and surrounding the outer circumference side of the imaging module 5. The imaging module 5 includes: an imaging-module main body 30; and a cylindrical portion 31 protruding from the center of the imaging-module main body 30 in the +Z direction. The cylindrical portion 31 houses the lens 4. The cylindrical portion 31 is coaxial with the optical axis L and extends in the direction of the optical axis L with a certain outer diameter. The imaging-module main body 30 houses the imaging element 9. The imaging element 9 is disposed in the −Z direction of the lens 4 on the optical axis L of the lens 4. The holder 29 and the imaging-module main body 30, which is located inside the holder 29 of the imaging module 5 with respect to the radial direction of the holder 29, constitute a movable-body main body 32. The cylindrical portion 31 of the imaging module 5 forms a movable-body protrusion 33 protruding from the center of the movable-body main body 32 in the +Z direction.

As illustrated in FIG. 8, the movable-body main body 32 has substantially an octagon shape when viewed from above. The movable-body main body 32 includes: a first side wall 35 and a second side wall 36 extending parallel to the Y-direction; and a third side wall 37 and a fourth side wall 38 extending parallel to the X-direction. The first side wall 35 is disposed in the −X direction from the second side wall 36. The third side wall 37 is disposed in the −Y direction from the fourth side wall 38. The movable-body main body 32 further includes a fifth side wall 39 and a sixth side wall 40 that are diagonally placed with respect to the direction of the first axis R1; and a seventh side wall 41 and an eighth side wall 42 that are diagonally placed with respect to the direction of the second axis R2. The fifth side wall 39 is disposed in the −X direction from the sixth side wall 40. The seventh side wall 41 is disposed in the −Y direction from the eighth side wall 42.

The first side wall 35 of the movable body 20 is secured to a first magnet 45 (shake-correction magnet) via a plate-shaped first yoke 44 that is made of a magnetic material. The first magnet 45 is divided into two in the Z-axis direction. The third side wall 37 of the movable body 20 is secured to a second magnet 47 (shake-correction magnet) via a plate-shaped second yoke 46 that is made of a magnetic material. The first magnet 45 and the second magnet 47 are arranged such that the same pole is assigned in the Z-axis direction. The second magnet 47 is divided into two in the Z-axis direction. The fourth side wall 38 of the movable body 20 is secured to a third magnet 49 (rolling-correction magnet) via a plate-shaped third yoke 48 that is made of a magnetic material. The third magnet 49 is divided into two in the circumferential direction.

The first magnet 45 and the second magnet 47 are shake-correction magnets for the shake-correction magnetic drive structure 25 that rotates the movable body 20 around the first axis R1 and the second axis R2. The shake-correction magnetic drive structure 25 includes, as shake-correction magnets, the first magnet 45 and the second magnet 47 disposed in the circumferential direction with the first axis R1 interposed therebetween. The third magnet 49 is a rolling-correction magnet for the rolling-correction magnetic drive structure 28 that rotates the movable body 20 around the optical axis L. The third magnet 49 is disposed on the side opposite to the second magnet 47 with the optical axis L interposed therebetween.

Rotation Support Structure

Figure 9:
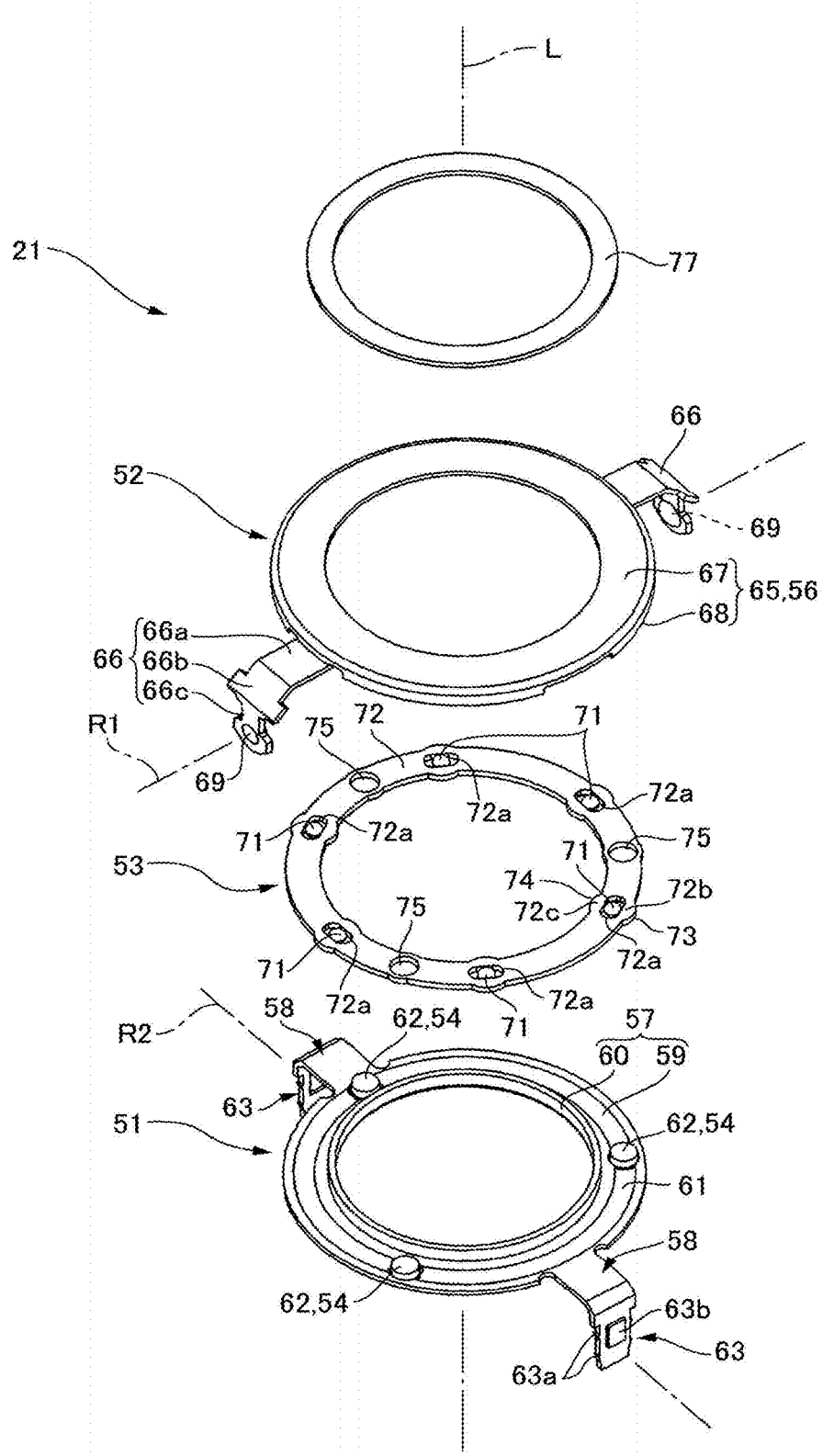
FIG. 9 is an exploded perspective view of the rotation support structure when viewed from one side in the optical axis direction.
Figure 10:
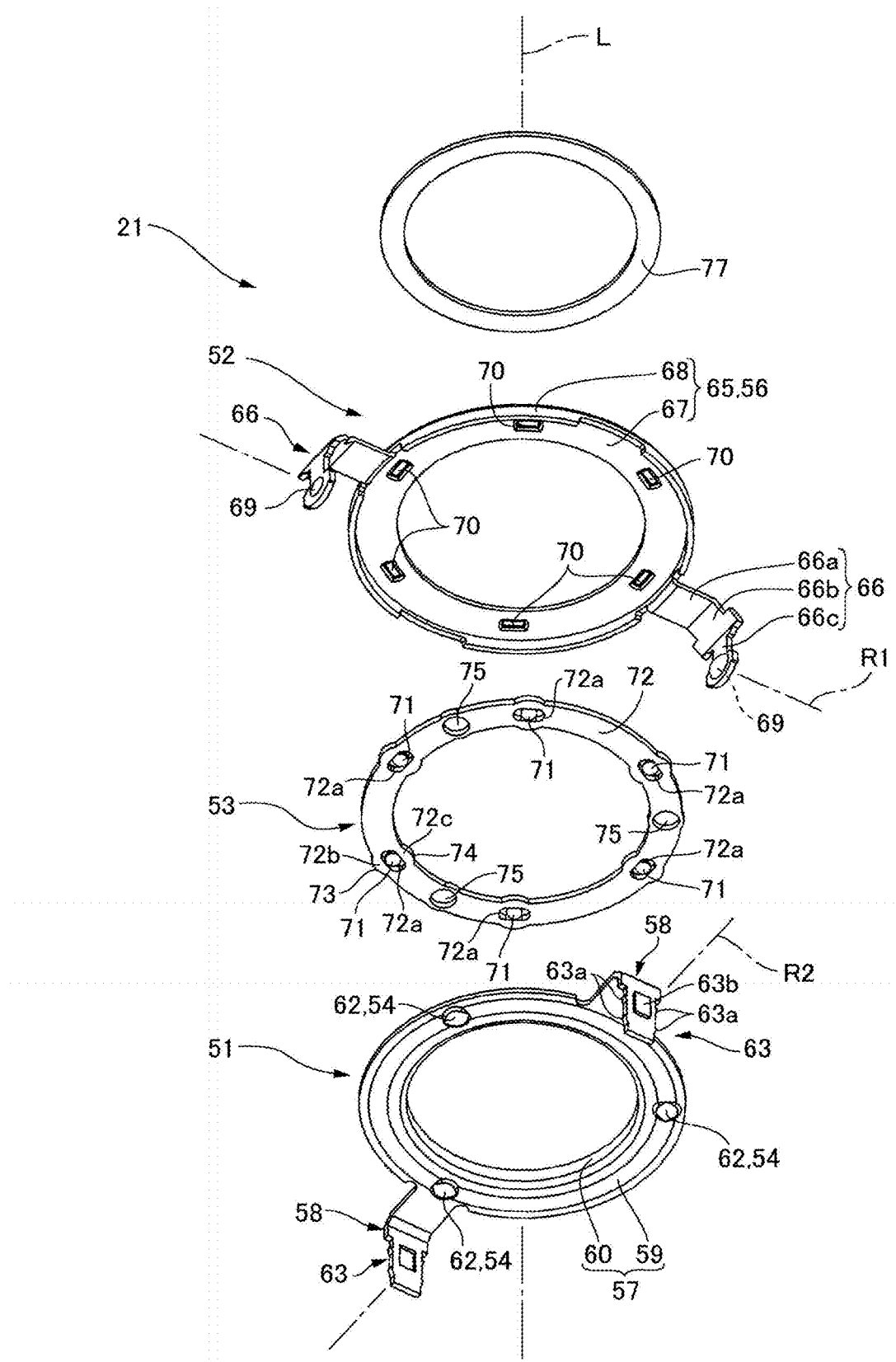
FIG. 10 is an exploded perspective view of the rotation support structure when viewed from the other side in the optical axis direction.

FIG. 9 is an exploded perspective view of the rotation support structure 21 when viewed in the +Z direction. FIG. 10 is an exploded perspective view of the rotation support structure 21 when viewed in the −Z direction. As illustrated in FIG. 9 and FIG. 10, the rotation support structure 21 includes: a plate roll 51 secured to the movable body 20; a plate holder 52 including a facing portion 56 facing the plate roll 51 in the Z-axis direction; and a rotation structure 53 allowing the rotation of the plate roll 51 and the plate holder 52 around the optical axis L. The rotation support structure 21 further includes a first pressurization structure 54 and a second pressurization structure 55 to bias the plate roll 51 in the direction so as to come close to the plate holder 52.

The plate roll 51 is made of a metal and a non-magnetic material. The plate roll 51 includes: a plate-roll annular portion 57 surrounding the optical axis L; and a pair of plate-roll extension portions 58 protruding from the plate-roll annular portion 57 to both sides in the direction of the second axis R2 and extending in the −Z direction. The plate-roll annular portion 57 includes: a plate-roll annular plate 59; and a plate-roll annular wall 60 (inner wall) bending and extending from the inner circumference edge of the plate-roll annular plate 59 in the +Z direction. The plate-roll annular wall 60 has a tubular shape. As illustrated in FIG. 9, the end surface of the plate-roll annular plate 59 with respect to the +Z direction includes a plate-roll annular groove 61 at the center in the radial direction. Pressurization magnets 62 are secured to the plate-roll annular plate 59 at three positions in the circumferential direction at an equal angular interval.

Each of the plate-roll extension portions 58 in the pair includes a secured portion 63 provided in the end portion in the −Z direction and secured to the movable body 20. The secured portion 63 includes a plurality of wedge-shaped protrusions 63a provided in both edges in the circumferential direction and having a wider width in the circumferential direction toward the +Z direction. The outer surface of the secured portion 63 with respect to the direction of the second axis R2 includes a rectangular protrusion 63b. The rectangular protrusion 63b protrudes by a larger degree in the direction of the second axis R2 toward the +Z direction.

The plate holder 52 is made of a magnetic material. The plate holder 52 includes a plate-holder annular portion 65; and a pair of plate-holder extension portions 66 protruding from the plate-holder annular portion 65 to both sides in the direction of the first axis R1 and extending in the −Z direction. The plate-holder annular portion 65 is, in the plate holder 52, a facing portion 56 facing the plate-roll annular portion 57 in the Z-axis direction.

The plate-holder annular portion 65 includes: a plate-holder annular plate 67 disposed on the side of the plate-roll annular portion 57 in the +Z direction; and a plurality of plate-holder circular arc walls 68 (outer walls) bending in the −Z direction from the outer circumference edge of the plate-holder annular plate 67. As illustrated in FIG. 10, plate-holder circular arc grooves 70 extending in the circumferential direction are provided on the end surface of the plate-holder annular plate 67 with respect to the −Z direction. According to this example, the six plate-holder circular arc grooves 70 are provided at an equal angular interval. Each of the plate-holder circular arc grooves 70 is opposed to the plate-roll annular groove 61 in the Z-axis direction.

Each of the plate-holder extension portions 66 in the pair includes: plate-holder first extension portions 66a extending from the plate-holder annular portion 65 to both sides in the direction of the first axis R1; a plate-holder second extension portion 66b extending from the outer circumference end of the plate-holder first extension portion 66a and inclining in the −Z direction and in a direction away from the plate-holder annular portion 65; and a plate-holder third extension portion 66c extending in the −Z direction from the edge of the plate-holder second extension portion 66b in the −Z direction on the outer circumference side of the movable body 20. As illustrated in FIG. 5, the plate-holder first extension portions 66a protrude in the direction of the first axis R1 from the edges of the plate-holder circular arc walls 68 in the −Z direction disposed at both sides in the direction of the first axis R1. The plate-holder third extension portion 66c in one of the plate-holder extension portions 66 is opposed to the fifth side wall 39 of the movable body 20 with a small gap in the direction of the first axis R1. The plate-holder third extension portion 66c in the other of the plate-holder extension portions 66 is opposed to the sixth side wall 40 of the movable body 20 with a small gap in the direction of the first axis R1. Each of the plate-holder third extension portions 66c includes a first-axis side recessed curved face 69 that is recessed inward (toward the movable body 20) in the radial direction on the line of the first axis R1.

As illustrated in FIG. 9 and FIG. 10, the rotation structure 53 includes a plurality of spherical objects 71 and a retainer 72. The spherical object 71 is made of a metal. The retainer 72 is made of a resin. The retainer 72 includes a plurality of spherical-object holding holes 72a holding the respective spherical objects 71 in a rollable manner. According to this example, the rotation structure 53 includes the six spherical objects 71. Therefore, the retainer 72 includes the six spherical-object holding holes 72a. The spherical object 71 is held by the spherical-object holding hole 72a to protrude from the retainer 72 in the −Z direction and in the +Z direction. According to this example, each of the spherical-object holding holes 72a is an elongated hole that is longer in the circumferential direction than in the radial direction. When the spherical object 71 is located at the center of the spherical-object holding hole 72a, there is a gap between the spherical object 71 and an outer retainer portion 72b of the retainer 72 on the outer circumference side of the spherical-object holding hole 72a and between the spherical object 71 and an inner retainer portion 72c of the retainer 72 on the inner circumference side of the spherical-object holding hole 72a.

The retainer 72 includes: an outer protrusion 73 protruding to the outer circumference side from the outer retainer portion 72b, which is located outside of each of the spherical-object holding holes 72a in the radial direction; and an inner protrusion 74 protruding to the inner circumference side from the inner retainer portion 72c, which is located inside of each of the spherical-object holding holes 72a in the radial direction. The retainer 72 includes retainer through-holes 75 perforating in the Z-axis direction at three positions in the circumferential direction.

As illustrated in FIG. 8, the plate-roll annular wall 60 is inserted into the inside of the plate-holder annular portion 65 in the −Z direction so that the plate roll 51 and the plate holder 52 are overlapping with each other in the Z-axis direction. The end portion in the +Z direction of the plate-roll annular wall 60 protrudes in the +Z direction as compared with the plate-holder annular portion 65. When the plate roll 51 and the plate holder 52 are overlapping with each other, the spherical objects 71 and the retainer 72 are disposed between the plate-holder annular portion 65 and the plate-roll annular portion 57.

When the retainer 72 is disposed between the plate-holder annular portion 65 and the plate-roll annular portion 57, the plate-holder circular arc wall 68 is in contact with the outer protrusion 73 from outside in the radial direction, as illustrated in FIG. 5. Further, the plate-roll annular wall 60 is in contact with the inner protrusion 74 from inside in the radial direction. Thus, the retainer 72 is positioned in the radial direction between the plate-holder annular portion 65 and the plate-roll annular portion 57. The end portion in the −Z direction of each of the spherical objects 71 housed in the respective spherical-object holding holes 72a of the retainer 72 is inserted into the plate-roll annular groove 61, and end portion thereof in the +Z direction is inserted into the plate-holder circular arc groove 70. When the retainer 72 is disposed between the plate-holder annular portion 65 and the plate-roll annular portion 57, the pressurization magnet 62 is inserted into the retainer through-hole 75.

As illustrated in FIG. 5 and FIG. 8, the edge of the plate-roll annular wall 60 in the +Z direction is secured to an annular plate member 77. When viewed in the direction of the optical axis L, the outer circumference portion of the plate member 77 is overlapping with the inner circumference edge portion of the plate-holder annular portion 65. A small gap is formed in the Z-axis direction between the plate member 77 and the plate-holder annular portion 65. The pressurization magnet 62, secured to the plate-roll annular portion 57 and inserted into the retainer through-hole 75, attracts the plate roll 51, which is made of a non-magnetic material, in the direction so as to come close to the plate holder 52. That is, the pressurization magnets 62 constitute the first pressurization structure 54 that biases the plate roll 51 in the direction so as to come close to the plate holder 52.

As illustrated in FIG. 6 and FIG. 8, the movable body 20 includes plate-roll securing holes 79 at the two edge portions of the movable-body main body 32 with respect to the direction of the second axis R2 to receive the secured portions 63 of the plate-roll extension portions 58 in the pair. The plate-roll securing hole 79 is provided in the holder 29. The plate-roll securing holes 79 extend in the −Z direction in parallel to the seventh side wall 41 and the eighth side wall 42.

The secured portion 63 of each of the plate-roll extension portions 58 of the plate roll 51 is pressed into the plate-roll securing hole 79 so that the rotation support structure 21 is secured to the movable body 20. When the secured portion 63 is inserted into the plate-roll securing hole 79, the movable-body protrusion 33 is inserted into the plate-roll annular wall 60. Accordingly, the movable-body protrusion 33 (the cylindrical portion 31) is fitted into the plate-roll annular wall 60 so that the plate roll 51 is secured to the movable body 20 in a state where the plate-roll annular wall 60 is positioned so as to be coaxial with the optical axis L. When the secured portion 63 of each of the plate-roll extension portions 58 is pressed into the plate-roll securing hole 79, the protrusion 63a and the protrusion 63b of the secured portion 63 are plastically deformed and crushed. Thus, the plate roll 51 and the movable body 20 are secured to each other. When the plate roll 51 and the movable body 20 are secured, the movable body 20 is rotatable around the optical axis L together with the plate roll 51.

When the plate roll 51 of the rotation support structure 21 and the movable body 20 are secured to each other, the plate holder 52, which is made of a magnetic material, is located on the side opposite to the first magnet 45, the second magnet 47, and the third magnet 49 with respect to the plate roll 51. In other words, the plate-holder annular portion 65 is located on the side opposite to the first magnet 45, the second magnet 47, and the third magnet 49 with the plate-roll annular portion 57 interposed therebetween in the Z-axis direction. Accordingly, the first magnet 45, the second magnet 47, and the third magnet 49 attract the plate-holder annular portion 65 in the direction so as to come close to the plate-roll annular portion 57. Thus, the first magnet 45, the second magnet 47, and the third magnet 49 constitute the second pressurization structure 55 that biases the plate roll 51 in the direction so as to come close to the plate holder 52. According to this example, the movable body 20 and the plate roll 51 are attracted toward the plate-holder annular portion 65 in the +Z direction due to the attractive forces of the first magnet 45, the second magnet 47, and the third magnet 49 attracting the plate-holder annular portion 65 in the direction to come close to the plate-roll annular portion 57.

Gimbal Structure

Figure 11:
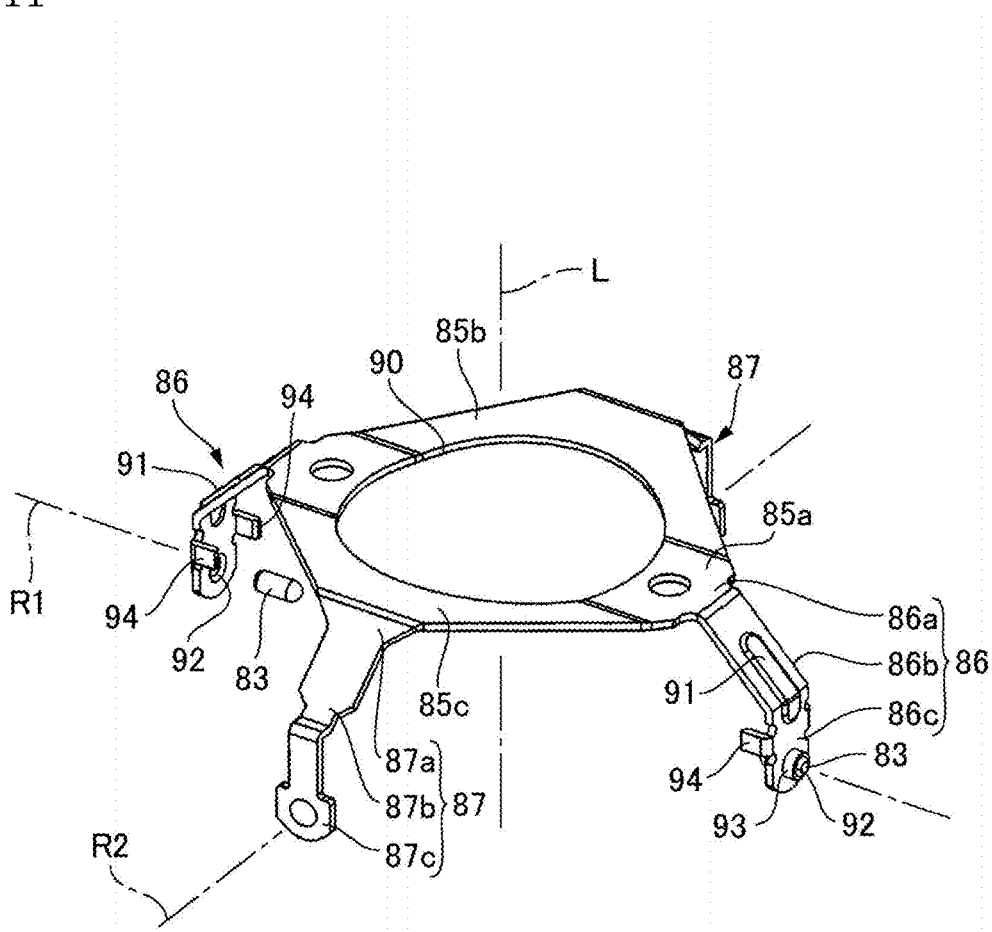
FIG. 11 is an exploded perspective view of a gimbal frame and a first-axis side shaft.

FIG. 11 is an exploded perspective view of a gimbal frame 80 and a first-axis side shaft 83. As illustrated in FIG. 4, the gimbal structure 22 includes: the gimbal frame 80; and a first coupling structure 81 coupling the gimbal frame 80 and the plate holder 52 rotatably around the first axis R1. The gimbal structure 22 further includes a second coupling structure 82 coupling the gimbal frame 80 and the securing body 23 rotatably around the second axis R2. As illustrated in FIG. 5 and FIG. 7, the first coupling structure 81 includes: the first-axis side shaft 83 protruding along the first axis R1 toward the plate holder 52 from the gimbal frame 80; and the first-axis side recessed curved face 69 provided in the plate holder 52 and rotatably contacting with the end of the first-axis side shaft 83. As illustrated in FIG. 6 and FIG. 7, the second coupling structure 82 includes: a second-axis side shaft 84 protruding along the second axis R2 toward the gimbal frame 80 from the securing body 23; and a second-axis side recessed curved face 95 provided in the gimbal frame 80 and contacting with the end of the second-axis side shaft 84.

Gimbal Frame

The gimbal frame 80 is a metallic plate spring. As illustrated in FIG. 8, the gimbal frame 80 includes: a gimbal-frame main body 85 disposed in the +Z direction from the plate holder 52; a pair of first-axis side gimbal frame extension portions 86 protruding from the gimbal-frame main body 85 toward both sides in the direction of the first axis R1 and extending in the −Z direction; and a pair of second-axis side gimbal frame extension portions 87 protruding from the gimbal-frame main body 85 to both sides in the direction of the second axis R2 and extending in the −Z direction. The gimbal-frame main body 85 includes: a center plate portion 85a having substantially a rectangular shape and extending in the direction of the first axis R1; a first inclined plate portion 85b extending from one side (the side in the −Y direction) of the center plate portion 85a with respect to the direction of the second axis R2 toward the outer circumference side and inclining in the +Z direction; and a second inclined plate portion 85c extending from the other side (the side in the +Y direction) of the center plate portion 85a with respect to the direction of the second axis R2 toward the outer circumference side and inclining in the +Z direction. The gimbal-frame main body 85 includes an opening 90 provided at the center and perforating in the Z-axis direction. The movable-body protrusion 33 is inserted into the opening 90.

As illustrated in FIG. 5, FIG. 7, and FIG. 8, the pair of first-axis side gimbal frame extension portions 86 is located on the outer circumference side of the plate holder 52. As illustrated in FIG. 8, each of the first-axis side gimbal frame extension portions 86 in the pair includes: a first-axis side gimbal frame extension portion first extension portion 86a extending in a direction away from the gimbal-frame main body 85 along the direction of the first axis R1; a first-axis side gimbal frame extension portion second extension portion 86b (inclined extension portion) extending from the end of the first-axis side gimbal frame extension portion first extension portion 86a in a direction away from the gimbal-frame main body 85 along the direction of the first axis R1 and inclining in the −Z direction; and a first-axis side gimbal frame extension portion third extension portion 86c (coupling extension portion) extending in the −Z direction from the end of the first-axis side gimbal frame extension portion second extension portion 86b in the −Z direction on the outer circumference side of the plate holder 52.

As illustrated in FIG. 5 and FIG. 8, the first-axis side gimbal frame extension portion first extension portion 86a protrudes from the center plate portion 85a in the direction of the first axis R1. The first-axis side gimbal frame extension portion third extension portion 86c includes a gimbal-frame extension portion through-hole 92 perforating in the direction of the first axis R1. The first-axis side gimbal frame extension portion third extension portion 86c includes a first-axis side shaft support cylindrical portion 93 protruding from the hole edge of the gimbal-frame extension portion through-hole 92 to the outer circumference side in the direction of the first axis R1. The first-axis side gimbal frame extension portion third extension portion 86c includes a pair of gimbal-frame extension portion protrusions 94 protruding to the inner circumference side from both edges in the circumferential direction. In the first-axis side gimbal frame extension portion third extension portion 86c, the pair of gimbal-frame extension portion protrusions 94 is located in the +Z direction of the gimbal-frame extension portion through-hole 92. A rib 91 is provided on the outer surface of the first-axis side gimbal frame extension portion 86 on the side opposite to the plate-holder extension portion 66 and extending from the first-axis side gimbal frame extension portion second extension portion 86b to the first-axis side gimbal frame extension portion third extension portion 86c. The rib 91 extends through a bend portion between the first-axis side gimbal frame extension portion second extension portion 86b and the first-axis side gimbal frame extension portion third extension portion 86c.

The first-axis side shaft 83 has a cylindrical shape and is inserted into the gimbal-frame extension portion through-hole 92 and the first-axis side shaft support cylindrical portion 93 to be held by the gimbal frame 80. Thus, the first-axis side shaft 83 extends on the first axis R1 in the direction of the first axis R1. The end of the first-axis side shaft 83 on the inner circumference side protrudes from the first-axis side gimbal frame extension portion third extension portion 86c toward the plate-holder extension portion 66. The end of the first-axis side shaft 83 on the inner circumference side has a hemispherical surface.

Next, as illustrated in FIG. 8, each of the second-axis side gimbal frame extension portions 87 in the pair includes: a second-axis side gimbal frame extension portion first extension portion 87a extending in a direction away from the gimbal-frame main body 85 along the direction of the second axis R2; a second-axis side gimbal frame extension portion second extension portion 87b extending from the end of the second-axis side gimbal frame extension portion first extension portion 87a in a direction away from the gimbal-frame main body 85 along the direction of the second axis R2 and inclining in the −Z direction; and a second-axis side gimbal frame extension portion third extension portion 87c extending from the end of the second-axis side gimbal frame extension portion second extension portion 87 in the −Z direction b in the −Z direction on the outer circumference side of the movable body 20. The second-axis side gimbal frame extension portion first extension portion 87a in one of the second-axis side gimbal frame extension portions 87 in the −Y direction protrudes from the edge of the first inclined plate portion 85b on the outer circumference side in the direction of the second axis R2. The second-axis side gimbal frame extension portion first extension portion 87a in one of the second-axis side gimbal frame extension portions 87 in the +Y direction protrudes from the edge of the second inclined plate portion 85c on the outer circumference side in the direction of the second axis R2. Each of the second-axis side gimbal frame extension portion third extension portions 87c includes a second-axis side recessed curved face 95 that is recessed toward the inner circumference side on the second axis R2.

First Coupling Structure

As illustrated in FIG. 7, the pair of plate-holder extension portions 66 is disposed between the pair of first-axis side gimbal frame extension portions 86 and the movable body 20. The first-axis side gimbal frame extension portion third extension portion 86c holding the first-axis side shaft 83 is opposed to the plate-holder third extension portion 66c including the first-axis side recessed curved face 69 on the first axis R1. The first coupling structure 81 is configured such that the end of the first-axis side shaft 83 protruding through the first-axis side gimbal frame extension portion 86 toward the inner circumference side is in contact with the first-axis side recessed curved face 69. According to this example, the first-axis side shaft 83 and the first-axis side recessed curved face 69 are in the point contact with each other. Accordingly, the rotation support structure 21 is supported by the gimbal frame 80 via the first coupling structure 81 rotatably around the first axis R1. Therefore, the movable body 20 supported by the rotation support structure 21 is supported by the gimbal structure 22 rotatably around the first axis R1. In a state where the first-axis side shaft 83 is in contact with the first-axis side recessed curved face 69, the plate-holder extension portions 66 are located on the inner side of the pair of gimbal-frame extension portion protrusions 94 provided on the first-axis side gimbal frame extension portions 86.

When the movable body 20 and the rotation support structure 21 are supported by the gimbal structure 22, the gimbal-frame main body 85, the plate-roll annular portion 57, and the plate-holder annular portion 65 are disposed on the side of the movable-body main body 32 in the +Z direction and on the outer circumference side of the movable-body protrusion 33. The plate-roll annular portion 57 is disposed between the gimbal-frame main body 85 and the movable-body main body 32 in the Z-axis direction. The plate-holder annular portion 65 is disposed on the side of the plate-roll annular portion 57 in the +Z direction and between the gimbal-frame main body 85 and the movable-body main body 32 in the Z-axis direction. The plate-roll annular portion 57 and the plate-holder annular portion 65 are disposed on the +Z direction from the first axis R1 and the second axis R2. The gimbal-frame main body 85, the plate-roll annular portion 57, and the plate-holder annular portion 65 are disposed on the side of the imaging element 9 in the +Z direction.

Securing Body

Figure 12:
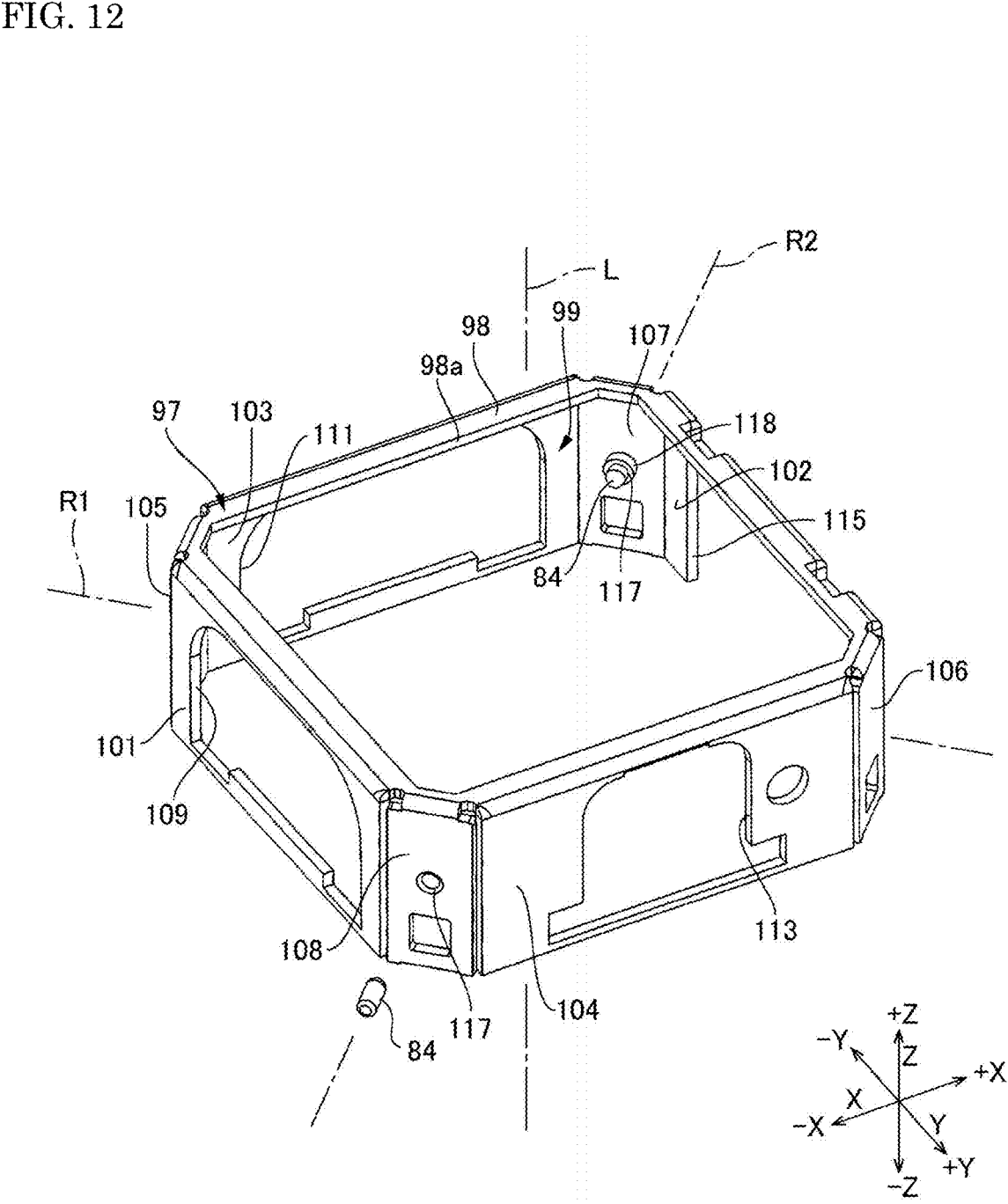
FIG. 12 is an exploded perspective view of a chassis and a second-axis side shaft.

FIG. 12 is an exploded perspective view of a chassis 97 and the second-axis side shaft 84. As illustrated in FIG. 7, the securing body 23 includes the frame-shaped chassis 97 (frame) surrounding the outer circumference side of the movable body 20 and the rotation support structure 21. The chassis 97 is made of a metal and a non-magnetic material. The chassis 97 has an octagon shape when viewed in the Z-axis direction. As illustrated in FIG. 12, the chassis 97 includes an octagonal frame-shaped plate portion 98 and a frame portion 99 disposed on the outer side of the movable-body main body 32 with respect to the radial direction. The frame portion 99 bends from the outer peripheral edge of the frame-shaped plate portion 98 and extends in the −Z direction.

The frame-shaped plate portion 98 has a constant thickness in the Z-axis direction. The frame portion 99 has a constant thickness in the direction perpendicular to the optical axis L. The frame-shaped plate portion 98 and the frame portion 99 have the same thickness. That is, the chassis 97 is formed by punching a plate with the development form that is the planar development of the chassis 97 to form a chassis substrate, bending the chassis substrate to form a three-dimensional shape, and then welding required areas. A rectangular opening 98a is provided at the center of the frame-shaped plate portion 98. When viewed in the Z-axis direction, the holder 29 of the movable body 20 is disposed on the inner circumference side of the opening 98a.

The frame portion 99 includes a first side plate 101 and a second side plate 102 extending parallel to the Y-direction and a third side plate 103 and a fourth side plate 104 extending parallel to the X-direction. The first side plate 101 is located in the −X direction from the second side plate 102. The third side plate 103 is located on the −Y direction of the fourth side plate 104. The frame portion 99 further includes, at the opposing corners with respect to the direction of the first axis R1, a fifth side plate 105 coupling the first side plate 101 and the third side plate 103 and a sixth side plate 106 coupling the second side plate 102 and the fourth side plate 104. The fifth side plate 105 and the sixth side plate 106 extend in parallel. The frame portion 99 further includes, at the opposing corners with respect to the direction of the second axis R2, an eighth side plate 108 coupling the first side plate 101 and the fourth side plate 104 and a seventh side plate 107 coupling the second side plate 102 and the third side plate 103. The seventh side plate 107 and the eighth side plate 108 extend in parallel.

As illustrated in FIG. 7 and FIG. 12, the first side plate 101 of the frame portion 99 includes a first coil holding opening 109. A first coil 110 (shake-correction coil) is inserted into the first coil holding opening 109. The first coil 110 has an elliptical shape that is elongated in the circumferential direction, and its center hole is oriented in the radial direction. The third side plate 103 of the frame portion 99 includes a second coil holding opening 111. A second coil 112 (shake-correction coil) is inserted into the second coil holding opening 111. The second coil 112 has an elliptical shape that is elongated in the circumferential direction, and its center hole is oriented in the radial direction. Furthermore, the fourth side plate 104 of the frame portion 99 includes a third coil holding opening 113. A third coil 114 (rolling-correction coil) is inserted into the third coil holding opening 113. The third coil 114 has an elliptical shape that is elongated in the Z-axis direction, and its center hole is oriented in the radial direction. As illustrated in FIG. 2, the third flexible printed board 8 extends along the outer circumference surfaces of the fourth side plate 104, the first side plate 101, and the third side plate 103. The first coil 110, the second coil 112, and the third coil 114 are electrically connected to the third flexible printed board 8.

The second side plate 102 includes a rectangular cutout portion 115 extending in the +Z direction from the end in the −Z direction. The first flexible printed board 6 and the second flexible printed board 7 coupled to the imaging module 5 extend from the optical-unit main body 3 in the +X direction via the cutout portion 115.

As illustrated in FIG. 12, the seventh side plate 107 and the eighth side plate 108 of the chassis 97 each include a through-hole 117 perforating in the direction of the second axis R2. The seventh side plate 107 and the eighth side plate 108 each include a tubular portion 118 provided at the hole edge of the through-hole 117 on the inner side (the surface on the side where the second-axis side gimbal frame extension portions 87 is disposed) and protruding in the direction of the second axis R2. The second-axis side shafts 84 are inserted into the respective through-holes 117 of the seventh side plate 107 and the eighth side plate 108. The second-axis side shaft 84 has a cylindrical shape and is inserted into the through-hole 117 to be supported by the tubular portion 118.

The second-axis side shafts 84 are made of a metal and are secured to the seventh side plate 107 and the eighth side plate 108, respectively, by welding. Therefore, a welding mark 120 is provided at the contact area between the second-axis side shaft 84 and the seventh side plate 107 so as to secure the second-axis side shaft 84 to the seventh side plate 107, and the welding mark 120 is provided at the contact area between the second-axis side shaft 84 and the eighth side plate 108 so as to secure the second-axis side shaft 84 to the eighth side plate 108. As illustrated in FIG. 6 and FIG. 7, the welding marks 120 are formed at the hole edge of the through-hole 117 on the outer surface of the seventh side plate 107 and at the hole edge of the through-hole 117 on the outer surface of the eighth side plate 108. The second-axis side shafts 84 secured to the seventh side plate 107 and the eighth side plate 108 extend on the second axis R2 in the direction of the second axis R2. The inner circumference end of the second-axis side shaft 84 protrudes from the frame portion 99 toward the inner circumference side. The inner circumference end of the first-axis side shaft 83 has a hemispherical surface.

Second Coupling Structure

As illustrated in FIG. 6, the second coupling structure 82 is formed such that the movable body 20, the rotation support structure 21, and the gimbal frame 80 are disposed inside the chassis 97 and the end portion of the second-axis side shaft 84 is inserted into and is in contact with the second-axis side recessed curved face 95 of the second-axis side gimbal frame extension portion third extension portion 87c. The securing body 23 and the gimbal frame 80 are coupled with the second coupling structure 82 so that the gimbal frame 80, the rotation support structure 21, and the movable body 20 are supported by the securing body 23 rotatably around the second axis R2.

As the gimbal frame 80 is a plate spring, the second-axis side gimbal frame extension portion 87 is elastically deformable in the direction of the second axis R2. Therefore, when the second-axis side shaft 84 is in contact with the second-axis side recessed curved face 95 of the second-axis side gimbal frame extension portion 87, the second-axis side gimbal frame extension portion 87 is bent to the inner circumference side. Accordingly, the second-axis side gimbal frame extension portion 87 is in the elastic contact with the inner circumference side of the second-axis side shaft 84 due to the elastic restoring force toward the outer circumference side. Thus, it is possible to prevent or suppress the disconnection between the second-axis side gimbal frame extension portions 87 and the frame portion 99.

Shake-Correction Magnetic Drive Structure and Rolling-Correction Magnetic Drive Structure When the movable body 20 supported by the gimbal structure 22 is disposed on the inner circumference side of the chassis 97, the first side wall 35 of the holder 29 is opposed to the first side plate 101 of the frame portion 99 with a gap in the X-axis direction. The second side wall 36 of the holder 29 is opposed to the second side plate 102 with a gap in the X-axis direction. The third side wall 37 of the holder 29 is opposed to the third side plate 103 with a gap in the Y-axis direction. The fourth side wall 38 of the holder 29 is opposed to the fourth side plate 104 with a gap in the Y-axis direction. The fifth side wall 39 of the holder 29 is opposed to the fifth side plate 105 with a gap in the direction of the first axis R1. The sixth side wall 40 of the holder 29 is opposed to the sixth side plate 106 with a gap in the direction of the first axis R1. The seventh side wall 41 of the holder 29 is opposed to the seventh side plate 107 with a gap in the direction of the second axis R2. The eighth side wall 42 of the holder 29 is opposed to the eighth side plate 108 with a gap in the direction of the second axis R2.

Thus, as illustrated in FIG. 3, the first magnet 45 secured to the first side wall 35 of the movable body 20 is opposed to the first coil 110 held by the chassis 97 with a gap in the X-direction. The first magnet 45 and the first coil 110 constitute the second shake-correction magnetic drive structure 27. Therefore, the power supply to the first coil 110 causes the movable body 20 to rotate around the Y-axis. The second magnet 47 secured to the third side wall 37 of the movable body 20 is opposed to the second coil 112 with a gap in the Y-direction. The second magnet 47 and the second coil 112 constitute the first shake-correction magnetic drive structure 26. Therefore, the power supply to the second coil 112 causes the movable body 20 to rotate around the X-axis. The shake-correction magnetic drive structure 25 combines the rotation of the movable body 20 around the Y-axis by the first shake-correction magnetic drive structure 26 and the rotation of the movable body 20 around the X-axis by the second shake-correction magnetic drive structure 27 so as to cause the movable body 20 to rotate around the first axis R1 and the second axis R2.

When the movable body 20 is disposed on the inner circumference side of the chassis 97, the third magnet 49 secured to the fourth side wall 38 of the movable body 20 is opposed to the third coil 114 with a gap in the Y-direction. The third magnet 49 and the third coil 114 constitute the rolling-correction magnetic drive structure 28. Therefore, the power supply to the third coil 114 causes the movable body 20 to rotate around the optical axis L.

As illustrated in FIG. 3 and FIG. 4, a first magnetic plate 123 is disposed on the first coil 110 on the side opposite to the movable body 20. Specifically, the first magnetic plate 123 is disposed on the first coil 110 on the side opposite to the movable body 20 with respect to the radial direction of the optical axis L. The first magnetic plate 123 is a rectangle that is elongated in the Z-axis direction and is disposed at the position overlapping with the center of the first coil 110 with respect to the Z-axis direction when viewed in the radial direction. The first magnetic plate 123 is opposed to the first magnet 45 of the movable body 20 via the first coil 110 and forms a magnetic spring that returns the movable body 20 to the reference rotation position in the rotation direction around the Y-axis. As illustrated in FIG. 3 and FIG. 7, a second magnetic plate 125 is disposed on the side opposite to the movable body 20 with respect to the third coil 114. Specifically, the second magnetic plate 125 is disposed on the side opposite to the movable body 20 with respect to the third coil 114 in the radial direction of the optical axis L. The second magnetic plate 125 is elongated in the circumferential direction. The second magnetic plate 125 is opposed to the third magnet 49 of the movable body 20 via the third coil 114 and forms a magnetic spring that returns the movable body 20 to the reference rotation position in the rotation direction around the optical axis L.

Function Effect

According to this example, the rotation support structure 21, which rotatably supports the movable body 20 around the optical axis L, is supported by the gimbal structure 22 rotatably around the first axis R1 and the second axis R2 perpendicular to the optical axis L. Accordingly, the rotation support structure 21 rotates together with the movable body 20 around the first axis R1 and the second axis R2. Therefore, even when the movable body 20 rotates around the first axis R1 or the second axis R2, the rotation axis of the movable body 20 by the rotation support structure 21 coincides with the optical axis L of the movable body 20. Thus, when the rolling-correction magnetic drive structure 28 is driven to rotate the movable body 20 while the movable body 20 rotates around the first axis R1 or the second axis R2, the movable body 20 rotates around the optical axis L.

In the rotation support structure 21, the rotation structure 53, which allows the plate roll 51 secured to the movable body 20 to rotate relative to the plate holder 52, includes the spherical objects 71 that roll in contact with the plate roll 51 and the plate holder 52. With the rotation structure 53, the plate roll 51 does not smoothly rotate relative to the plate holder 52 without the application of force that causes the spherical objects 71 to be always in contact with both the plate roll 51 and the plate holder 52. To solve this disadvantage, according to this example, the plate holder 52 is made of a magnetic material, and the first magnet 45 and the second magnet 47 of the shake-correction magnetic drive structure 25 and the third magnet 49 of the rolling-correction magnetic drive structure 28 are disposed on the side opposite to the plate holder 52 of the plate roll 51. Therefore, the first magnet 45, the second magnet 47, and the third magnet 49 attract the plate holder 52 toward the plate roll 51. That is, the first magnet 45, the second magnet 47, and the third magnet 49 constitute the second pressurization structure 55 that applies a force to bring the plate holder 52 and the plate roll 51 close to each other. Thus, the rotation structure 53 allows the plate roll 51 to smoothly rotate relative to the plate holder 52.

According to this example, the shake-correction magnetic drive structure 25 includes, as shake-correction magnets, the first magnet 45 and the second magnet 47 that are arranged in the circumferential direction with the first axis R1 interposed therebetween. The third magnet 49 of the rolling-correction magnetic drive structure 28 is disposed on the side opposite to the second magnet 47 with the optical axis L interposed therebetween. Specifically, the third magnet 49 is disposed on the side opposite to the second magnet 47 with respect to the first magnet 45 in the circumferential direction and with the second axis R2 interposed between the first magnet 45 and the third magnet 49. Therefore, the first magnet 45, the second magnet 47, and the third magnet 49 attract the plate holder 52 in three directions around the optical axis L.

The first magnet 45, the second magnet 47, and the third magnet 49 are located on the outer circumference side as compared with the plate-roll annular portion 57. Therefore, the first magnet 45, the second magnet 47, and the third magnet 49 easily attract the plate-holder annular portion 65.

The plate holder 52 includes the pair of plate-holder extension portions 66 protruding from the plate-holder annular portion 65 to both sides in the direction of the first axis R1 and extending in the direction of the optical axis L on both sides in the direction of the first axis R1 of the movable body 20. The gimbal structure 22 includes the gimbal frame 80 and the first coupling structure 81 that rotatably couples the plate holder 52 and the gimbal frame 80. The gimbal frame 80 includes the gimbal-frame main body 85 that is overlapping with the movable body 20 when viewed in the direction of the optical axis L; and the pair of first-axis (R1)side gimbal frame extension portions 86 protruding from the gimbal-frame main body 85 toward both sides in the direction of the first axis R1 and extending in the direction of the optical axis L on the outer circumference side of the pair of plate-holder extension portions 66. The first coupling structure 81 includes: the pair of first-axis (R1) side shafts 83 held by the pair of first-axis (R1) side gimbal frame extension portions 86 and protruding on the first axis R1 toward the position of the optical axis L; and the first-axis (R1) side recessed curved face 69 provided in each of the plate-holder extension portions 66 in the pair and rotatably contacting with the end of the first-axis (R1) side shaft 83. The gimbal-frame main body 85 is disposed on the side opposite to the first magnet 45, the second magnet 47, and the third magnet 49 with the plate-roll annular portion 57 and the plate-holder annular portion 65 interposed therebetween in the Z-axis direction. Therefore, the gimbal frame 80 may support the movable body 20 rotatably around the first axis R1. In a state where the movable body 20 is supported by the gimbal frame 80 via the rotation support structure, the first magnet 45, the second magnet 47, and the third magnet 49 mounted on the movable body 20 may attract the plate-holder annular portion 65 of the rotation support structure 21.

According to this example, the second coupling structure 82, which rotatably couples the gimbal frame 80 and the securing body 23 around the second axis R2, includes the pair of second-axis (R2) side shafts 84 held by the diagonal corners of the frame-shaped chassis 97 with respect to the direction of the second axis R2 and protruding toward the position of the optical axis L on the second axis R2; and the pair of second-axis (R2) side recessed curved faces 95 provided in the gimbal frame 80 and contacting with the ends of the second-axis (R2) side shafts 84. Thus, the second coupling structure 82 may couple the gimbal frame 80 and the securing body 23 rotatably around the second axis R2.

According to this example, the pressurization magnet 62 secured to the plate-roll annular portion 57 is provided as the first pressurization structure 54. Thus, the plate-holder annular portion 65 made of a magnetic material may be attracted toward the plate-roll annular portion 57 by the pressurization magnet 62.

Although the rolling-correction magnetic drive structure 28 is disposed in the +Y direction of the imaging module 5, the rolling-correction magnetic drive structure 28 may be disposed in the +X direction from the imaging module 5. In this case, the rolling-correction magnetic drive structure 28 includes the third magnet 49 secured to the second side wall 36 of the movable body 20 and the third coil 114 secured to the second side plate 102 of the frame portion 99. Therefore, the third magnet 49 is located on the side opposite to the first magnet 45 with the optical axis L interposed therebetween. Even in this case, the first magnet 45, the second magnet 47, and the third magnet 49 may attract the plate holder 52 in three directions around the optical axis L.

Modification

Figure 13:
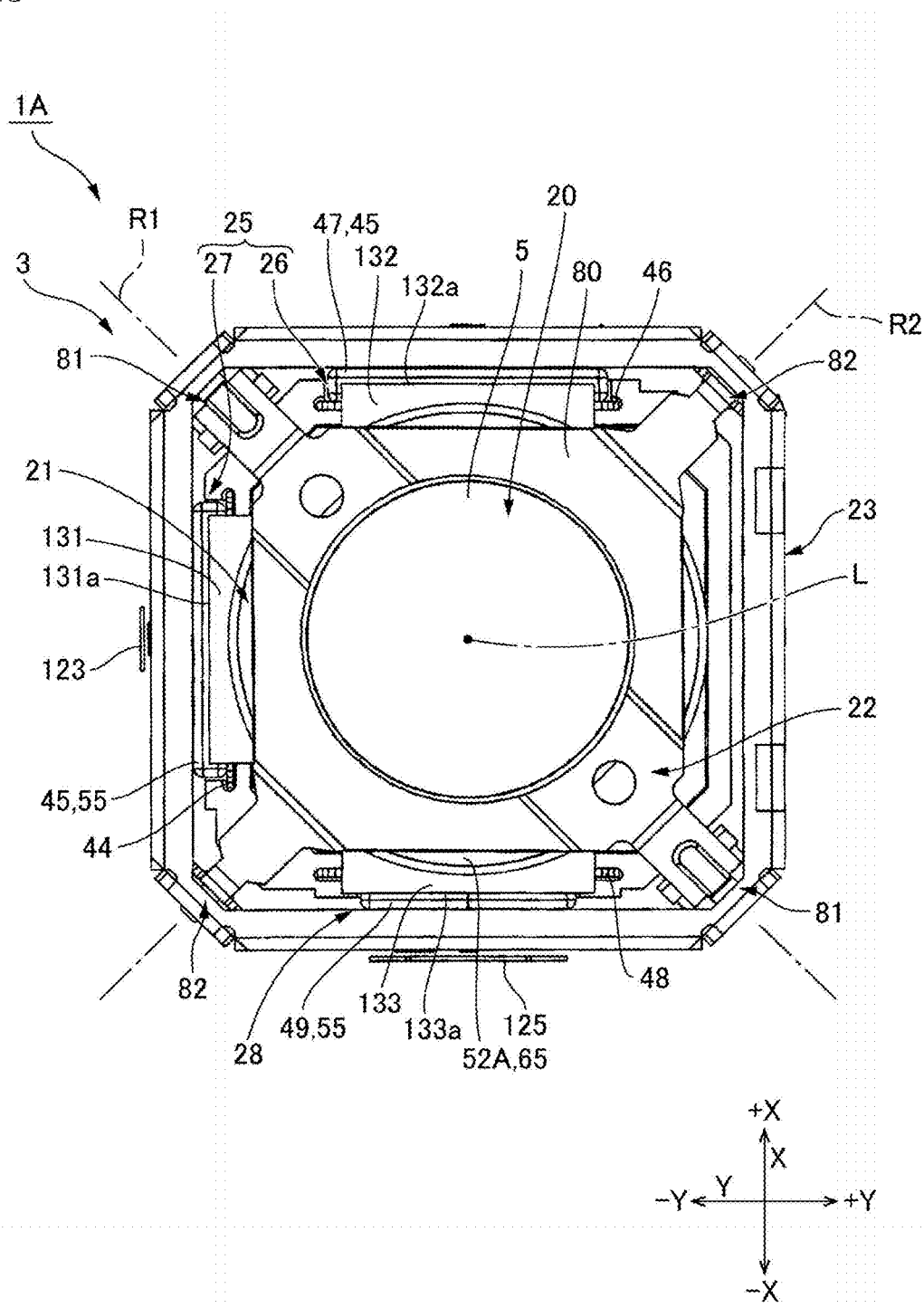
FIG. 13 is a plan view of a unit main body of an optical unit with a shake correction function according to a modification.
Figure 14:
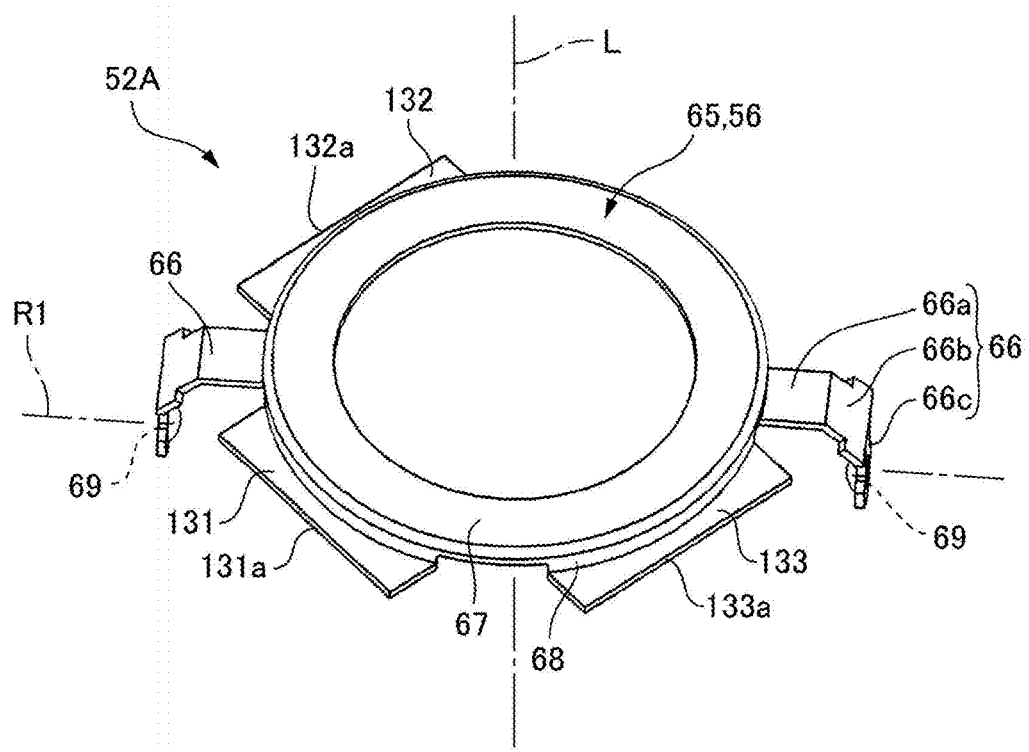
FIG. 14 is a perspective view of a plate holder of the optical unit with a shake correction function of FIG. 13.

FIG. 13 is a plan view of a unit main body of an optical unit 1A with a shake correction function according to a modification. FIG. 14 is a perspective view of a plate holder 52A of the optical unit 1A with a shake correction function of FIG. 13. In the optical unit 1A with a shake correction function according to this example, the shape of the plate holder 52A of the rotation support structure 21 is different from that of the plate holder 52 of the above-described optical unit 1 with a shake correction function. Other structures are the same as those of the above-described optical unit 1 with a shake correction function. Therefore, in the description, the structure corresponding to that in the optical unit 1 with a shake correction function is denoted by the same reference numeral. Although the plate holder 52A is described, the description of other structures is omitted.

The plate holder 52A is made of a magnetic material. As illustrated in FIG. 14, the plate holder 52A includes: the plate-holder annular portion 65; and the pair of plate-holder extension portions 66 protruding from the plate-holder annular portion 65 to both sides in the direction of the first axis R1 and extending in the −Z direction. The plate-holder annular portion 65 is, in the plate holder 52A, the facing portion 56 facing the plate-roll annular portion 57 in the Z-axis direction. The plate-holder annular portion 65 includes: the plate-holder annular plate 67 located in the +Z direction from the plate-roll annular portion 57; and the plate-holder circular arc walls 68 that bend in the −Z direction from the outer circumference edge of the plate-holder annular plate 67.

According to this example, the plate holder 52A includes: a first protrusion 131 protruding in the −X direction from the plate-holder annular portion 65 toward the first magnet 45; a second protrusion 132 protruding in the −Y direction toward the second magnet 47; and a third protrusion 133 protruding in the +Y direction toward the third magnet 49. The first protrusion 131, the second protrusion 132, and the third protrusion 133 each extend from the edge of the plate-holder circular arc wall 68 in the −Z direction toward the outer circumference side. An edge 131a of the first protrusion 131 in the −X direction extends in the Y-axis direction along the first magnet 45. An edge 132a of the second protrusion 132 in the −Y direction extends in the X-axis direction along the second magnet 47. An edge 133a of the third protrusion 133 in the +Y direction extends in the X-axis direction along the third magnet 49.

As illustrated in FIG. 13, when the optical-unit main body 3 is viewed in the Z-axis direction, the edge of the first protrusion 131 in the −X direction is located at the center of the first magnet 45 with respect to the X-axis direction or slightly on the inner circumference side (the side of the optical axis L) of the center of the first magnet 45 with respect to the X-axis direction. The edge of the second protrusion 132 in the −Y direction is located at the center of the second magnet 47 with respect to the Y-axis direction or slightly on the inner circumference side of the center of the second magnet 47 with respect to the Y-axis direction. The edge of the third protrusion 133 in the +Y direction is located at the center of the third magnet 49 with respect to the Y-axis direction or slightly on the inner circumference side of the center of the third magnet 49 with respect to the Y-axis direction. The other structures of the plate holder 52A except for the first protrusion 131, the second protrusion 132, and the third protrusion 133 are the same as those of the plate holder 52. Therefore, as illustrated in FIG. 10, the end surface of the plate-holder annular plate 67 in the −Z direction includes the six plate-holder circular arc grooves 70 extending in the circumferential direction. Each of the plate-holder circular arc grooves 70 is opposed to the plate-roll annular groove 61 in the Z-axis direction.

According to this example, too, the plate holder 52A is made of a magnetic material, and the first magnet 45 and the second magnet 47 of the shake-correction magnetic drive structure 25 and the third magnet 49 of the rolling-correction magnetic drive structure 28 are disposed on the side opposite to the plate holder 52A with respect to the plate roll 51. Therefore, the first magnet 45, the second magnet 47, and the third magnet 49 constitute the second pressurization structure 55 to apply the force so as to bring the plate holder 52A and the plate roll 51 close to each other.

According to this example, as the plate holder 52A includes the first protrusion 131, the second protrusion 132, and the third protrusion 133, the first magnet 45, the second magnet 47, and the third magnet 49 may be close to the plate holder 52A. Thus, the first magnet 45, the second magnet 47, and the third magnet 49 may easily attract the plate holder 52A.

When the rolling-correction magnetic drive structure 28 is disposed in the +X direction from the imaging module 5, the rolling-correction magnetic drive structure 28 includes the third magnet 49 secured to the second side wall 36 of the movable body 20. Therefore, in this case, the third protrusion 133 protrudes in the +X direction from the plate-holder annular portion 65 toward the third magnet 49.

The first pressurization structure 54 may be omitted from the optical unit 1 with a shake correction function and the optical unit 1A with a shake correction function.

What is claimed is:

1. An optical unit with a shake correction function, comprising:
   a movable body including a lens;
   a rotation support structure to support the movable body rotatably around an optical axis of the lens;
   a gimbal structure to support the rotation support structure rotatably around a first axis intersecting with the optical axis and rotatably around a second axis intersecting with the optical axis and the first axis;
a securing body to support the movable body via the gimbal structure and the rotation support structure;
a shake-correction magnetic drive structure to rotate the movable body around the first axis and the second axis; and
a rolling-correction magnetic drive structure to rotate the movable body around the optical axis, wherein
the rotation support structure includes:
a plate roll secured to the movable body;
a plate holder including a facing portion facing the plate roll; and
a rotation structure to allow rotation of the plate roll and the plate holder,
the shake-correction magnetic drive structure includes:
a shake-correction magnet secured to the movable body; and
a shake-correction coil secured to the securing body and facing the shake-correction magnet,
the rolling-correction magnetic drive structure includes:
a rolling-correction magnet secured to the movable body; and
a rolling-correction coil secured to the securing body and facing the rolling-correction magnet,
the shake-correction magnet and the rolling-correction magnet are arranged in a circumferential direction around the optical axis,
the rotation structure includes a plurality of spherical objects to roll in contact with the plate roll and the facing portion, and
the plate holder is made of a magnetic material and disposed on a side opposite to the shake-correction magnet and the rolling-correction magnet with respect to the plate roll.

2. The optical unit with a shake correction function according to claim 1, wherein
the first axis is perpendicular to the optical axis,
the second axis is perpendicular to the optical axis and the first axis,
the shake-correction magnetic drive structure includes, as the shake-correction magnet, a first magnet and a second magnet that are arranged in the circumferential direction with the first axis interposed between the first magnet and the second magnet, and
the rolling-correction magnet is disposed on a side opposite to the first magnet or the second magnet with respect to the optical axis.

3. The optical unit with a shake correction function according to claim 2, wherein
the plate roll includes a plate-roll annular portion overlapping with the movable body when viewed in a direction of the optical axis,
the plate-roll annular portion is coaxial with the optical axis,
the plate holder includes, as the facing portion, a plate-holder annular portion facing the plate-roll annular portion, and
the first magnet, the second magnet, and the rolling-correction magnet are disposed on an outer circumference side of the plate-roll annular portion.

4. The optical unit with a shake correction function according to claim 3, wherein
the plate holder includes:
a first protrusion protruding from the plate-holder annular portion toward the first magnet;
a second protrusion protruding from the plate-holder annular portion toward the second magnet; and
a third protrusion protruding from the plate-holder annular portion toward the rolling-correction magnet.

5. The optical unit with a shake correction function according to claim 4, wherein
the plate holder includes a pair of plate-holder extension portions protruding from the plate-holder annular portion to both sides with respect to a direction of the first axis and extending in the direction of the optical axis on both sides in the direction of the first axis of the movable body,
the gimbal structure includes:
a gimbal frame; and
a first coupling structure to couple the plate holder and the gimbal frame rotatably around the first axis,
the gimbal frame includes:
a gimbal-frame main body overlapping with the movable body when viewed in the direction of the optical axis; and
a pair of first-axis side gimbal frame extension portions protruding from the gimbal-frame main body to both sides with respect to the direction of the first axis and extending in the direction of the optical axis on an outer circumference side of the pair of plate-holder extension portions,
the first coupling structure includes:
a pair of first-axis side shafts held by the pair of first-axis side gimbal frame extension portions, respectively, and protruding along the first axis to an inner circumference side; and
a first-axis side recessed curved face provided in each of the pair of plate-holder extension portions and rotatably contacting with an end of one of the pair of first-axis side shafts, and
the gimbal-frame main body is disposed on a side opposite to the first magnet, the second magnet, and the rolling-correction magnet with respect to the plate-roll annular portion and the plate-holder annular portion in the direction of the optical axis.

6. The optical unit with a shake correction function according to claim 5, wherein
the gimbal structure includes a second coupling structure to couple the gimbal frame and the securing body rotatably around the second axis,
the securing body includes a frame to surround an outer circumference side of the movable body, the rotation support structure, and the gimbal frame, and
the second coupling structure includes:
a pair of second-axis side shafts held by diagonal corners in a direction of the second axis of the frame, respectively, and protruding along the second axis from the frame to an inner circumference side; and
a pair of second-axis side recessed curved faces provided in the gimbal frame and contacting with ends of the pair of second-axis side shafts, respectively.

7. The optical unit with a shake correction function according to claim 3, wherein
the plate holder includes a pair of plate-holder extension portions protruding from the plate-holder annular portion to both sides with respect to a direction of the first axis and extending in the direction of the optical axis on both sides in the direction of the first axis of the movable body, the gimbal structure includes:
   a gimbal frame; and
   a first coupling structure to couple the plate holder and the gimbal frame rotatably around the first axis,
the gimbal frame includes:
   a gimbal-frame main body overlapping with the movable body when viewed in the direction of the optical axis; and
   a pair of first-axis side gimbal frame extension portions protruding from the gimbal-frame main body to both sides with respect to the direction of the first axis and extending in the direction of the optical axis on an outer circumference side of the pair of plate-holder extension portions,
the first coupling structure includes:
   a pair of first-axis side shafts held by the pair of first-axis side gimbal frame extension portions, respectively, and protruding along the first axis to an inner circumference side; and
   a first-axis side recessed curved face provided in each of the pair of plate-holder extension portions and rotatably contacting with an end of one of the pair of first-axis side shafts, and
the gimbal-frame main body is disposed on a side opposite to the first magnet, the second magnet, and the rolling-correction magnet with respect to the plate-roll annular portion and the plate-holder annular portion in the direction of the optical axis.

8. The optical unit with a shake correction function according to claim 7, wherein
the gimbal structure includes a second coupling structure to couple the gimbal frame and the securing body rotatably around the second axis,
the securing body includes a frame to surround an outer circumference side of the movable body, the rotation support structure, and the gimbal frame, and
the second coupling structure includes:
   a pair of second-axis side shafts held by diagonal corners in a direction of the second axis of the frame, respectively, and protruding along the second axis from the frame to an inner circumference side; and
   a pair of second-axis side recessed curved faces provided in the gimbal frame and contacting with ends of the pair of second-axis side shafts, respectively.

9. The optical unit with a shake correction function according to claim 3, further comprising a pressurization magnet secured to the plate-roll annular portion and facing the plate-holder annular portion.

* * * * *